(12) United States Patent
Banzai

(10) Patent No.: US 6,613,417 B1
(45) Date of Patent: Sep. 2, 2003

(54) BALLON MADE OF SYNTHETIC RESIN AND A METHOD FOR MANUFACTURING THE BALLON

(75) Inventor: Haruo Banzai, Machida (JP)

(73) Assignee: Transworld Information Inc., Tokyo (JP)

(*) Notice: Subject to any disclaimer, the term of this patent is extended or adjusted under 35 U.S.C. 154(b) by 218 days.

(21) Appl. No.: 09/708,973

(22) Filed: Nov. 8, 2000

(30) Foreign Application Priority Data

Nov. 8, 1999 (JP) ............................. 11-316177
Nov. 6, 2000 (JP) ......................... 2000-337232

(51) Int. Cl.[7] ............................................. B32B 27/30
(52) U.S. Cl. .................... 428/195; 428/518; 427/372.2; 427/388.4
(58) Field of Search ................... 428/518, 195; 427/372.2, 388.4

(56) References Cited

U.S. PATENT DOCUMENTS 5,009,648 A * 4/1991 Aronoff et al. ............. 604/332
6,231,970 B1 * 5/2001 Andersen et al. .......... 106/145.1
6,435,935 B1 * 8/2002 Komaba ........................ 446/220

* cited by examiner

Primary Examiner—D. Lawrence Tarazano
(74) Attorney, Agent, or Firm—Norris McLaughlin & Marcus

(57) ABSTRACT

The present invention relates to a balloon made of a synthetic resin film, such as nylon, having a thin film on the surface thereof; on the thin film printing can be conducted by the use of a printer for use in computers. The thin film, which is printable with a water base ink, includes a water soluble emulsion including polyvinyl emulsion, water, and a potato starch, and an oilness binder and a white pigment. In a preferred embodiment, the thin film has a lower layer film containing an oilness binder, a white pigment and an upper layer film containing a polyvinyl acetate emulsion, water and a potato starch; these lower and lower layer films are applied on the outer surface of the balloon in this order to obtain a balloon made of a synthetic resin film with a thin film which is printable with a water base ink.

37 Claims, 6 Drawing Sheets

BALLON MADE OF SYNTHETIC RESIN AND A METHOD FOR MANUFACTURING THE BALLON

FIELD OF THE INVENTION

The present invention relates to a balloon made of a synthetic resin film, such as a nylon film, on the surface of which a thin film is formed in order to conduct printing an image, characters, some so on, in good manner with the aid of a printer for use in computers. Particularly, the present invention relates to a balloon made of a synthetic resin film, which has a thin film on the surface thereof made of a polyvinyl acetate emulsion, a water-soluble polymer consisting of water and a potato starch, and a white pigment; it is printable on the thin film with a water base ink.

BACKGROUND OF THE INVENTION

Balloons made of nylon having a laminated film thereon are well known as conventional balloons made of synthetic resin. In order to print an images or designs on the surface of such balloons, a silk screen process printing is used, however, no water base ink can be used for the printing process.

When a full-color printing is required on balloons, the images or designs is directly printed on a rolled synthetic resin film before the film is processed to make up balloons, with the aid of flexography or gravure printing; the thus printed film is then processed to a bag making to be finished as balloons.

In case that it is required to print some images or designs on the surface of balloons after the bag making procedure has been taken, a screen process printing is normally used. However, the cost for plate making and printing becomes rather expensive, and there exists a technical limit in the full-color printing.

Recently, printing techniques have become such that a beautiful color printing is available near us. It is now required to easily print beautiful full-color images, such as a photo image, etc. on the surface of balloons. However, numerous costs, such as primary color separating cost, plate-making cost, and printing cost are taken; the total cost becomes about ¥300,000.—for conducting silk screen process printing, or it takes several hundreds thousand yen even for flexography or a gravure printing. It is suggested to print the images on balloons using a printer for use in computers. However, a water base ink used in the printer cannot be applicable to print images, etc. on the surface of balloons hereto, because the material of the balloon surface, such as nylon, has a hydrophobic character.

The present invention has for its purpose to solve the problem and provides novel and creative balloons made of synthetic film resin on the outer surface of which a thin film, printable with a water base ink, is formed. According to the present invention, a thin film made of macromolecular emulsion prepared with a special composition is formed on the outer surface of the balloon made of synthetic resin film, which is essentially hydrophobic; the thin film absorbs the water-base ink used in the printers and makes the ink dry.

By forming the thin film on the outer surface of balloons made of synthetic resin which accepts a water base ink used in printers for use in computers, all advantages offered by the printers can be obtained when printing an images or designs on the surface of balloons. As a result, the problem about the cost and the printing quality when printing an images or designs on the surface of balloons by the conventional method can be solved.

Furthermore, as a solution for the problem mentioned in the prior patent application filed by the present applicant, both the upper layer film and the lower layer film are used in the present invention, so that it is prevented that the adhesion of the film remarkably decreases due to a dirt or changes with time on the surface of balloons. By using the lower layer film, it can be prevented that the adhesion of the film decreases due to the change of properties of the surface of balloons, so that the upper layer film can be formed thereon in a good manner.

Particularly, by using a polyvinyl acetate, a thin film having a high transparency can be obtained; the whole amount of the water base ink from the printer is accepted to the upper layer film and the ink is reflected by the lower layer film, so that the color is transmitted through the transparent upper layer film and reflected by the lower layer film; as a result a print clearly representing the color can be obtained.

Here, the word "accept" should be is defined. "The thin film which accepts a water base ink" means a thin film having a performance that when printing is conducted with the aid of a printer for use in computers, i.e. an ink-jet type printer, fine ink dots are absorbed in the thin film without causing stain, and kept there, and the condition can be continued until the water content of the ink evaporate. The thin film, which accepts a water base ink, is, for instance, a thin film made of a mixture comprising a polyvinyl acetate emulsion, water, and a potato starch, or a thin film made of a mixture obtained by adding any other macropolymer emulsion to the emulsion made of water and any starch. The thin film should be printable with a water base ink.

It should be noted that the composition of each material and the concentration thereof are represented by weight percent according to the new measurement law, however the term "mass" is omitted here.

By forming the thin film on the surface of balloons, printers for use in computers can be used to print an images or designs on the surface of the balloon, and thus the cost for printing on the balloon can be decreased to only the cost for the ink, because no plate-making is necessary. According to the invention, a full-color printing can be realized on balloons with the printing cost of about JP¥30.

DISCLOSURE OF THE INVENTION

The balloons made of synthetic resin film according to the present invention comprises a thin film, which is printable with a water base ink, is formed on the surface thereof, wherein the film is made of a material including a polyvinyl acetate emulsion, water and any starch.

The balloons made of synthetic resin film according to the invention has an aspect that the material for the thin film, which is printable with a water base ink, further comprises a white pigment and the starch is a potato starch.

The balloons according to the present invention has another aspect in that the thin film, which is printable with a water-base ink, is made of a material including an adhesive in a condition of emulsion, water and any starch.

The balloons according to the present invention has still another aspect in that the material of the thin film, which is printable with a water base ink, further includes a white pigment and the starch is a potato starch.

More concretely, the balloons made of synthetic resin film on the surface of which a thin film, that is printable with a water base ink, is formed according to the invention has a characteristic in that: a first emulsion is obtained by mixing a potato starch and water with a ratio of 4% to 96%~20% to 80% and being subjected to a heat treatment, and a second emulsion for forming a thin film is obtained by adding a polyvinyl acetate emulsion containing a water content of 45~55% to the first emulsion with a ratio of 6 to 4~8 to 2; the thus obtained second emulsion is formed on the surface of the balloons to form the thin film thereon with the aid of a screen process printing. Further, the balloons made of synthetic resin film according to the invention has another aspect in that the balloon comprises an adhesive and a sheet having a thin film, which is printable with a water base ink; wherein the film sheet is attached to the balloon surface by means of the adhesive; the thin film is obtained in such a manner that a first emulsion is obtained by mixing a potato starch and water with a ratio of 7% to 93%~13% to 87%, adding a white pigment thereto, and being subjected to a heat treatment; a second emulsion for forming a thin film is obtained by adding a polyvinyl acetate emulsion containing a water content of 55% to the first emulsion; and the thus obtained second emulsion is formed on the surface of said sheet. The balloon made of synthetic resin film on the surface of which a thin film, which is printable with a water base ink, is formed, according to the invention has a characteristic in that: a first emulsion is obtained by mixing a potato starch and water with a ratio of 7% to 93%~13% to 87% and being subjected to a heat treatment; and a second emulsion for forming a thin film is obtained by mixing a polyvinyl acetate emulsion containing a water content of 55% and the first emulsion together with the ratio of 70% to 30%; and the thus obtained second emulsion is formed on the surface of the balloon to form the thin film with the aid of screen process printing. Further, the balloon made of synthetic resin film according to the invention comprises a thin film made of the emulsion formed on the outer surface of the balloon and the thin film has a function to accept a water base ink and the ink is dried there. The balloon made of synthetic resin film on the surface of which a thin film, which is printable with a water base ink, is formed according to the invention has a characteristic in that: a first emulsion is obtained by mixing a potato starch and water with a ratio of 7% to 93%~13% to 87% together, adding a white pigment thereto and being subjected to a heat treatment; a second emulsion is obtained by adding a polyvinyl acetate emulsion having a water content of 55% to the first emulsion with a ratio of 6 to 4–8 to 2; the second emulsion is applied on the surface of the balloon with the aid of a screen process printing to form the thin film. The invention also provides a method for manufacturing balloons made of synthetic resin film on the outer surface of which a thin film, which is printable with a water base ink, is formed has a characteristic in that: the method comprises steps: preparing a first emulsion by adding water to any starch and being subjected to a heat treatment, obtaining a second emulsion for forming a thin film by adding a polyvinyl acetate emulsion to the first emulsion and stirring; and applying the thus obtained second emulsion to the surface of the balloon to form the thin film.

The method for manufacturing balloons made of synthetic resin film has an aspect in that a white pigment is further added to the material and the starch is a potato starch.

Furthermore, the method for manufacturing balloons made of synthetic resin film on the outer surface of which a thin film, which is printable with a water-base ink, is according to the invention comprises steps of: preparing a first emulsion by mixing a potato starch and water together with a mixing ratio of 4% to 96%~20% to 80%, being subjected to a heat treatment at a temperature of 64~67° C. and then stirring; adding a polyvinyl acetate emulsion to the first emulsion and mixing and stirring to obtain a second emulsion for forming a thin film; and applying the thus obtained second emulsion to the surface of the balloon to form the thin film on the surface of the balloon.

More concretely, the method for manufacturing balloons made of synthetic resin film on the outer surface of which a thin film, which is printable with a water-base ink, is formed according to the invention comprises steps: mixing a potato starch and water with a mixing ratio of 4% to 96%~20% to 80%, heating the mixture and adding a white pigment thereto, and stirring the mixture until the material becomes 67° C. to obtain the first emulsion; adding a polyvinyl acetate emulsion to the first emulsion and mixing and stirring to obtain a second emulsion for forming a thin film; and applying the second emulsion to the surface of the balloon to form the thin film, wherein almost no light is reflected by the surface of the balloon.

Furthermore, the method for manufacturing balloons made of synthetic resin film on the outer surface of which a thin film, which is printable with a water-base ink, is according to the invention comprises steps: mixing a potato starch and water with a mixing ratio of 7% to 93%~13% to 87%, being subjected to a heat treatment at a temperature of 64 to 67° C. and stirring them to obtain the first emulsion; mixing a polyvinyl acetate emulsion having a water content of 55% with the first emulsion with a mixing ratio of 70% to 30% stirring them to obtain a second emulsion for forming a thin film; and applying the second emulsion to the surface of the balloon to form a thin film thereon with the aid of a screen process printing.

Furthermore, the method for manufacturing balloons made of synthetic resin film on the outer surface of which a thin film, which is printable with a water-base ink, formed according to the invention comprises steps: mixing 10% of a potato starch and 90% of water together and heating the mixture, at the same time adding a white pigment thereto and stirring the mixture until the temperature becomes 67° C. to obtain the first emulsion; mixing a polyvinyl acetate emulsion having a water content of 55% to the first emulsion with a mixing ratio of 70% to 30% and stirring them to obtain a second emulsion for forming a thin film; and applying the second emulsion to the surface of the balloon to form a thin film with the aid of a screen process printing; wherein almost no light is reflected by the surface of the balloon.

Apart from the above, the method for manufacturing balloons made of synthetic resin film on the outer surface of which a thin film, which is printable with a water-base ink, is formed according to the invention comprises steps: mixing water and any starch together, heating the mixture to obtain a first emulsion; adding a polyvinyl acetate emulsion to the first emulsion to obtain a second emulsion for forming a thin film; and applying the second emulsion to the surface of the balloon to form the thin film thereon with the aid of a screen process printing.

The method for manufacturing balloons made of synthetic resin film on the outer surface of which a thin film, which is printable with a water-base ink, is formed according to the invention comprises steps: mixing water and a potato starch together, heating the mixture to obtain a first emulsion; adding a polyvinyl acetate emulsion to the first emulsion to obtain a second emulsion for forming a thin film; and applying the second emulsion to the surface of the balloon to form the thin film thereon with the aid of a screen process printing.

Further, the method for manufacturing balloons made of synthetic resin film on the outer surface of which a thin film, which is printable with a water-base ink, is formed according to the invention comprises steps: mixing a potato starch and water with the ratio of 7% to 93%~13% to 87% and heating the mixture, at the same time, adding a white pigment thereto and stirring the mixture until the temperature becomes 67° C. to obtain a first emulsion; adding a polyvinyl acetate emulsion to the first emulsion and mixing and stirring them to obtain a second emulsion for forming a thin film; and applying the second emulsion to the surface of the balloon to form a thin film with the aid of a screen process printing; wherein almost no light is reflected by the surface of the balloon.

Furthermore, the method for manufacturing balloons made of synthetic resin film on the outer surface of which a thin film, which is printable with a water-base ink, is according to the invention comprises steps: mixing a potato starch and water with a mixing ratio of 7% to 93%~13% to 87%, being subjected to a heat treatment at a temperature of 64 to 67° C. and stirring them to obtain the first emulsion; mixing a polyvinyl acetate emulsion having a water content of 55% with the first emulsion with a mixing ratio of 70 to 30% stirring them to obtain a second emulsion for forming a thin film; and applying the second emulsion to the surface of the balloon to form a thin film thereon with the aid of a screen process printing.

Further, the method for manufacturing balloons made of synthetic resin film on the outer surface of which a thin film, which is printable with a water-base ink, is formed according to the invention comprises steps: mixing a potato starch and water together with the ratio of 7% to 93%~13% to 87%, heating the mixture, at the same time, adding a white pigment, and stirring until the temperature becomes 67° C. to obtain the first emulsion; adding a polyvinyl acetate emulsion having a water content of 55% to the first emulsion with a ratio of 70% to 30%, and mixing and stirring them to obtain a second emulsion for forming a thin film; and applying the second emulsion to the surface of the balloon to form a thin film thereon with the aid of a screen process printing; and wherein almost no light is reflected by the surface of the balloon.

Furthermore, the method for manufacturing balloons made of synthetic resin film on the outer surface of which a thin film, which is printable with a water-base ink, is formed according to the invention comprises steps: mixing a potato starch and water together with a ratio of 4% to 96%~20% to 80%, heating the mixture until the temperature becomes 67° C. and stirring them to obtain the first emulsion; adding a polyvinyl acetate emulsion to the first emulsion with the ratio of 6 to 4~8 to 2 to obtain a second emulsion for forming a thin film; applying the second emulsion to form the thin film on the balloon; and printing an images or designs on the thin film.

The balloon made of synthetic resin film according to the invention comprises a thin film, which is printable with the aid of water-base ink, being formed on the surface of the balloon, an assistant guide paper having a size slightly smaller than the balloon for fixing the balloon thereon and guiding the balloon into a printer together with the paper.

Furthermore, the method for manufacturing a balloon made of synthetic resin film on the outer surface of which a thin film, which is printable with a water base ink, is formed comprises a step of: fixing the balloon on an assistant guide paper which is slightly smaller than the balloon.

The balloon made of synthetic resin film on which a thin film, which is printable with the aid of a water-base ink, is formed according to the present invention has an aspect in that: the thin film constructs a lower layer film including an oilness binder and a white pigment, and a upper layer film a polyvinyl acetate emulsion, water and any starch; the lower layer film and the upper layer film are applied on the outer surface of the balloon in this order to form the thin film printable with a water base ink.

It is preferred that the starch is a potato starch.

Further, the balloon made of synthetic resin on which a thin film which is printable with the aid of a water-base ink, is formed according to the present invention has an aspect in that: the lower layer film includes the oilness binder and the white pigment with a ratio of 85% to 15%~70% to 30%, the upper layer film is obtained in such a manner that water and a potato starch are mixed together and heated, and a polyvinyl acetate emulsion containing a water content of 45% to 55% is added to the mixture with the ratio of 4 to 6~2 to 8; the lower layer film and the upper layer film are applied on the surface of the balloon in this order to form the thin film thereon with the aid of a screen process printing.

Furthermore, the balloon made of synthetic resin on which a thin film which is printable with the aid of a water-base ink, is formed according to the present invention has another aspect in that: the lower layer film includes the oilness binder and the white pigment with a ratio of 85% to 15%~70% to 30%, the upper layer film is obtained in such a manner that water and a potato starch are mixed together with a mixing ratio of 7% to 93%~13% to 87% and heated, and a polyvinyl acetate emulsion containing a water content of 45% to 55% is added to the mixture with the ratio of 4 to 6~2 to 8; the lower layer film and the upper layer film are applied on the surface of the balloon in this order to form the thin film thereon with the aid of a screen process printing.

A balloon made of synthetic resin film on the surface of which a thin film, which is printable with the aid of a water-base ink, is formed according to the present invention has still another aspect in that: the lower layer film and the upper layer film are formed in this order on the surface of the balloon with the aid of a screen process printing, wherein the upper layer film is formed by applying the emulsion for forming the upper layer film a plural number of times.

The method for manufacturing a balloon made of synthetic resin film on the outer surface of which a thin film, which is printable with the aid of a water-base ink, is formed, has still another aspect in that: the lower layer film is formed on the outer surface of the balloon in such a manner that a material including an oilness binder and a white pigment is applied on the surface of the balloon and dried; the upper layer film is formed on the lower layer film in such a manner that a material including water and any starch is heated and then applied on the lower layer film.

In this method, it is preferred that the starch is a potato starch.

Further, the method for manufacturing a balloon made of synthetic resin on the outer surface of which a thin film, which is printable with the aid of a water-base ink, is formed, has still another aspect in that the lower layer film is formed on the surface of the balloon with the aid of a screen process printing, and the lower layer film is obtained by mixing the oilness binder and the white pigment with a ratio of 85 to 15%~70 to 30%.

Furthermore, the method for manufacturing a balloon made of synthetic resin on the outer surface of which a thin film which is printable with the aid of a water base ink is formed, has another aspect in that the upper layer film is obtained in such a manner that water and a potato starch are mixed together and subjected to a heat treatment to obtain a first emulsion, and a polyvinyl acetate emulsion containing a water content of 45% to 55% is added to the first emulsion with a ratio of 4 to 6~2 to 8 to obtain a second emulsion, the second emulsion for the upper layer film; and the second emulsion is applied to the lower layer film.

Moreover, the method for manufacturing a balloon made of synthetic resin film on the outer surface of which a thin film, which is printable with the aid of a water-base ink, is formed according to the invention has another aspect in that the upper layer film is obtained in such a manner that water and a potato starch are mixed together with the ratio of 4% to 96%~20% to 80% and stirring the mixture until the temperature becomes 67° C. to obtain a first emulsion, then a polyvinyl acetate emulsion containing a water content 45% to 55% is mixed with the first emulsion with a ratio of 4 to 6~2 to 8 to obtain a second emulsion for forming the thin film; the thus obtained second emulsion is applied on the lower layer film.

Moreover, the method for manufacturing a balloon made of synthetic resin film on the outer surface of which a thin film, which is printable with the aid of a water-base ink, is formed according to the invention has another aspect in that the upper layer film is obtained in such a manner that water and a potato starch are mixed together with the ratio of 7% to 93%~13% to 87% and stirring the mixture until the temperature becomes 67° C. to obtain a first emulsion, then a polyvinyl acetate emulsion containing a water content 45% to 55% is mixed with the first emulsion with a ratio of 4 to 6~2 to 8 to obtain a second emulsion for forming the thin film; the thus obtained second emulsion is applied on the lower layer film.

Moreover, the balloon made of synthetic resin on the outer surface of which a thin film, which is printable with the aid of a water-base ink, is formed, according to the present invention has another aspect in that: the balloon is fixed on an assistant guide paper where an adhesive layer is placed having a dimension slightly larger than that of the balloon.

Moreover, the balloon made of synthetic resin on the outer surface of which a thin film, which is printable with the aid of a water base ink, is formed has still another aspect in that: the balloon is fixed on an assistant guide paper; the assistant guide paper has adhesive layers on both surfaces thereof so that the balloon can be fixed to the paper in a folded manner.

The method for manufacturing a balloon made of synthetic resin on the outer surface of which a thin film, on which images are printable with the aid of a water base ink, comprises a step that: the balloon is fixed on an assistant guide paper where an adhesive layer having a dimension slightly larger than that of the balloon is provided.

Further, the method for manufacturing a balloon made of synthetic resin on the outer surface of which a thin film, printable with the aid of a water base ink, further comprises a step that the balloon is fixed on an assistant guide paper for printing; the assistant guide paper has adhesive layers on both surfaces thereof so that the balloon is fixed to the paper in a folded manner.

THE BEST MODE OF THE INVENTION

Embodiments of the present invention will be explained in detail below, referring to the attached drawings.

Figure 1:
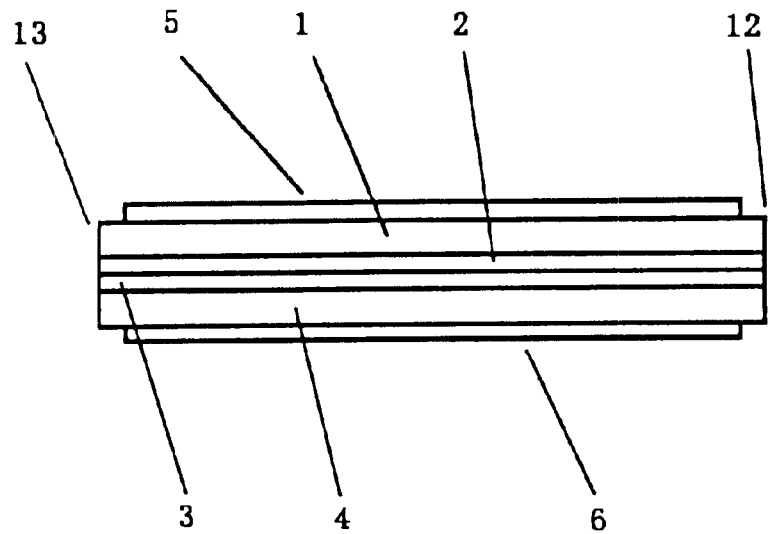
FIG. 1 is a schematic view showing a cross-section of a balloon made of synthetic resin film according to the invention.
Figure 2:
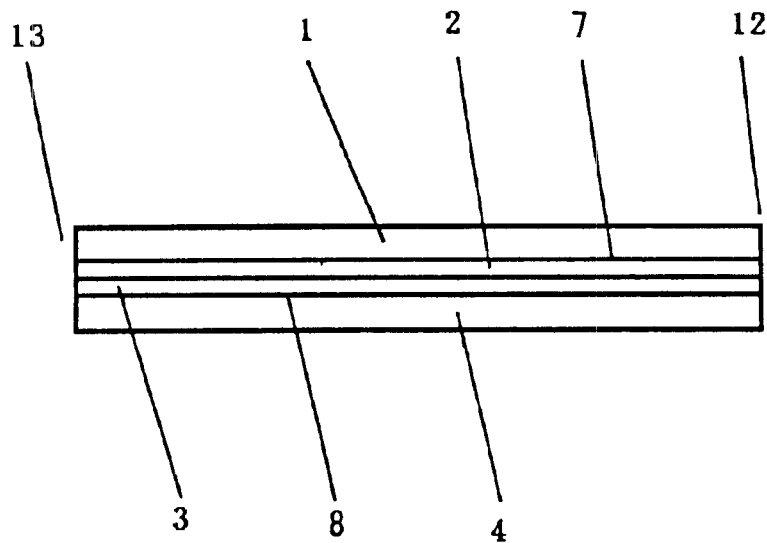
FIG. 2 is a schematic view depicting a cross-section of a balloon made of synthetic resin film according to the invention.
Figure 3:
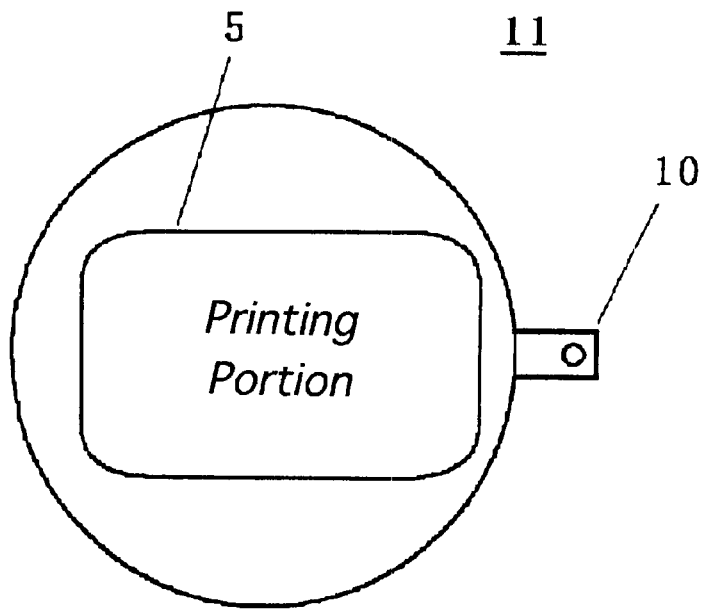
FIG. 3 is a schematic view illustrating a printable portion of a balloon made of synthetic resin film.

FIG. 1 is a cross-sectional view showing a balloon made of synthetic resin film according to the invention, FIG. 2 also is a cross-sectional view depicting a balloon made of synthetic resin film according to the invention, and FIG. 3 is a plan view illustrating a printable part of the balloon.

Figure 4:
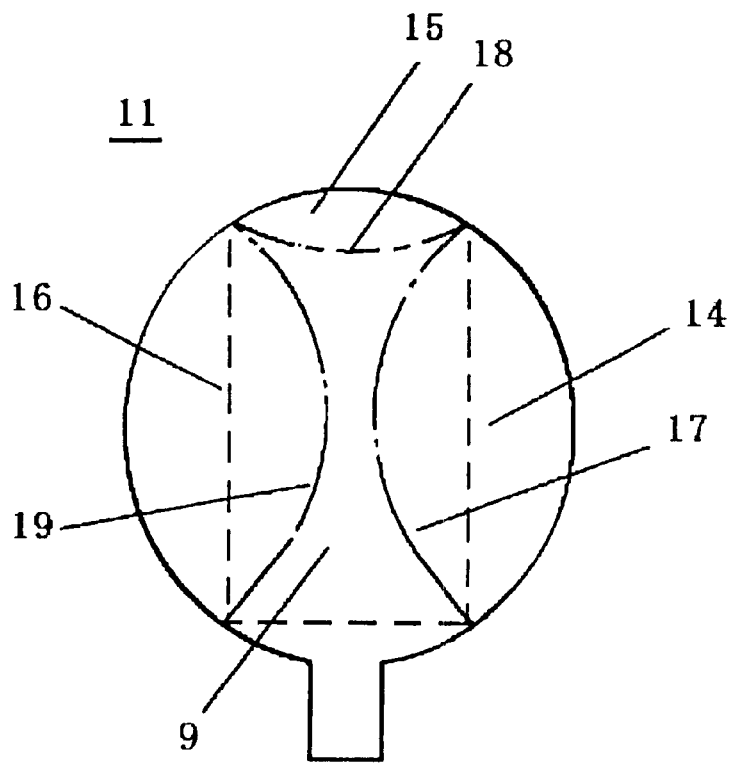
FIG. 4 is a schematic view representing a balloon made of synthetic resin film for explaining the position at which the balloon is folded so as to cover an assistant paper before printing is conducted.
Figure 5:
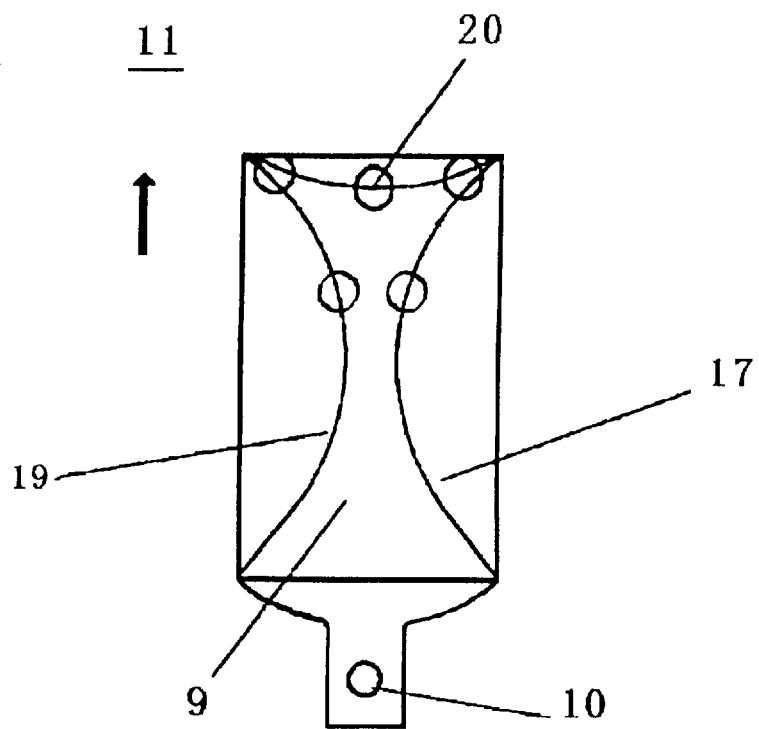
FIG. 5 is a schematic view showing a condition of the balloon made of synthetic resin film represented in FIG. 4 with an assistant paper at the time of printing.
Figure 6:
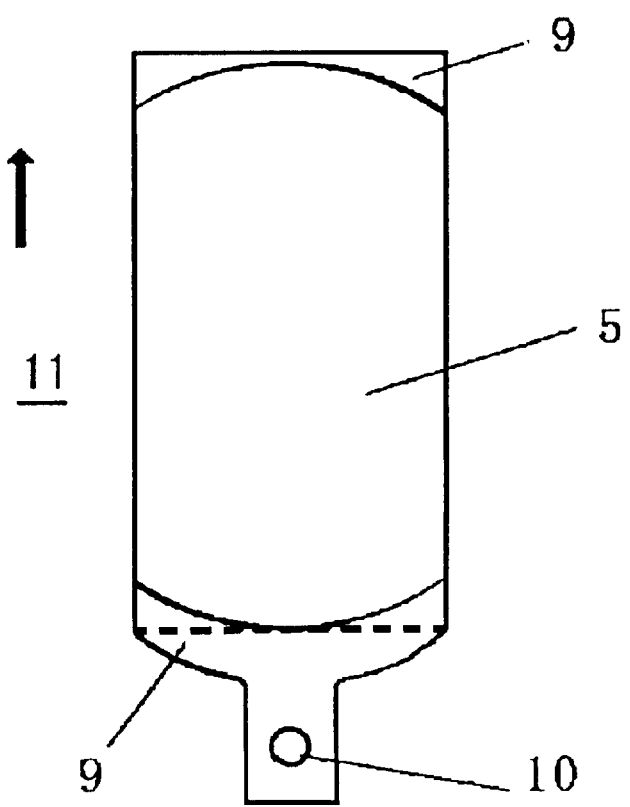
FIG. 6 is a schematic view depicting the balloon made of synthetic resin film in FIG. 5 from a rear side, where a thin film is formed.

FIGS. 4 to 6 are for explaining the condition that a balloon made of synthetic resin film is attached to an assistant paper for printing when a printing is conducted on the balloon; FIG. 4 shows a position where the balloon made of synthetic resin is partially folded with the assistant paper before the printing is conducted; FIG. 5 depicts the condition of the balloon with the assistant paper when printing is conducted; and FIG. 6 illustrates the view of the balloon depicted in FIG. 5 from a rear direction.

FIG. 2 shows a cross section of a balloon made of synthetic resin film according to the present invention; the balloon comprises nylon film layers 1 and 4, and laminated low density polyethylene film layers 2 and 3, and peripheral portions 12 and 13. The peripheral portions 12 and 13 are cut with the aid of a shearing cutting method and a heat-sealing is conducted to obtain a balloon. FIG. 3 is a plan view of the balloon, which has an inlet 10 through which air is blown into the balloon to inflate it; in the inlet 10 a non return valve (not shown) is provided. Printing with the aid of a printer is available on the printable portion 5.

The nylon film and the low density polyethylene film are laminated in a conventional method. The numerical references 7 and 8 in FIG. 2 represent the adhesive surfaces between these films, respectively.

The usable thickness of the nylon films 1 and 4 is 10~12 μm, and the usable thickness of the low density polyethylene films 2 and 3 is 15~18 μm. It should be noted that PET (polyethylene terephthalate) film or CPP (Casting Polypropylene) film can be used for the nylon film.

In the balloon shown in FIG. 1, the thin printable film 5, which will be explained below, is further formed on the outer surface of the nylon film 1 in addition to the constitution shown in FIG. 2. In the same manner, another thin printable film 6 is provided on the other outer surface of the nylon film 4 in the case that the printing is conducted on both surfaces. According to the invention, a thin film is formed on the surface of a balloon made of synthetic resin film and printing is conducted on the surface of the thin film with the aid of a printer; a method for forming the thin film will be explained below.

Embodiment 1

Composition 1

| | |
|---|---|
| polyvinyl acetate emulsion | 700 g |
| potato starch | 30 g (10%) |
| water | 270 ml (90%) |

Material of the Thin Film and the Method for Forming the Thin Film

First step: Potato starch 30 g (10%) is dissolved in water 270 ml (90%), and the thus obtained mixture is stirred to obtain a first emulsion.

Second step: The first emulsion obtained in the first step was added to a polyvinyl acetate emulsion (containing a water contents of 45%~55%) and mixed and stirred. It should be noted that 300 g of the first emulsion was added to 700 g of the polyvinyl acetate emulsion.

Third step: Further, these two emulsions were mixed well in a tank with a mixer for 20 to 25 minutes; thereby an ink state emulsion having an excellent dispersibility could be obtained without causing sedimentation due to the difference in the mass of particles. The thus obtained ink-state emulsion was printed on the outer surface of the balloon with the aid of a screen process printing. After the ink-state emulsion got dry, a thin film, on which images are printable with a water-base ink, could be obtained.

The ink-state emulsion having an ability to form a thin film was selected from emulsions which satisfied requirements of viscosity, particular diameter and adhering properties with the balloon surface.

Particularly, the following points are important that a thin film which accepts a water-base ink can be formed on the outer surface of the balloon made by a synthetic resin film having a hydrophobic nature, such as nylon film, and that a printing can be conducted on such a thin film in good manner, while keeping the function as a balloon.

A printer for use in personal computers was used to conduct the printing. Inventor's attention was paid upon abilities with respect to a water-base ink which is used in ink-jet type printers, or bubble jet (trademark) printers, because if the film can absorb and dry such a water-base ink, a beautiful and clear single-color or full-color printing would be available with a low cost even in a small amount. In order to realize this, the following points should be solved. More concretely, the following eight points can be cited as the requirements for high polymer emulsion which is used as the material for the thin film.

(1) To be light in weight, because of the using purpose as a balloon.
(2) To have a fine texture on the surface of the thin film.
(3) To have a water-base ink absorbing property and to be able to get dry at a normal temperature.
(4) To be able to form a thin film in where a water-base ink does not stain.
(5) After forming the thin film on the surface of the balloon made of a thin synthetic resin film, the surface of the thin film should be changed, in other words, the thin film should not be shrunk or expanded.
(6) To be applicable on the surface of the balloon, and operable in good manner during the emulsion is applied on the balloon.
(7) To have a high adhesive abilities to the balloon made of synthetic resin film
(8) To be non-toxic, harmless and safe.

As the material satisfying the above requirements, a polyvinyl emulsion, which is hydrophilic but not hydrophobic, is selected as a second emulsion. On the other hand, the mixture of water and a potato starch is selected as a first emulsion, because it has a property to absorb the water-base ink and to make the ink dry.

The mixing ratio of the first emulsion and the second emulsion is determined by a total point of view, such as the thin film characteristics of the first and second emulsions, operability such as adhesion, life time of the thin film, a printing characteristic, etc. However, in the present invention, the numerical values of the mixing ratio do not have a limited significant, but it should be understood that the numerical values have a reasonable tolerance.

The thin film material can be obtained by mixing these emulsions. Further, the ink-state emulsion is required not only to have a function as a thin film material to be applied on the outer surface of a balloon but also to be formed on the outer surface as a thin film, which is printable with a water-base ink. The thin film is required to be printable with a water-base ink for use in printers easily and clearly. More concretely, the thin film is required to suit the ink for use in ink jet type or bubble jet (trademark) type printers. The water base ink is black, or colored consisting of yellow, magenta and cyan. It is still further required for the thin film material that the water-base ink does not have stain or color shading when the printing is conducted, and after the film gets dry, the ink should have has a water resistance and no color deterioration should be generated.

The polyvinyl acetate emulsion has a function to fix the thin film on the surface of the balloon made of synthetic resin film. Further, another function is also recognized in the emulsion to make the surface of the balloon made of synthetic resin film semi-gloss after the emulsion gets dry and to emphasize the gloss on the surface of the balloon.

A potato starch is used as one of the materials of the thin film because of its water absorbing properties. The potato starch has a high water absorbing property and easily makes the film dry, so that the ink is fixed to the thin film well and does not show a stain; after the thin film gets dry the color of the ink is kept well there, therefore the deterioration of the printed image can be prevented for long period.

Any starch other than potato starch can also be used. The starches are basically required to have a high water absorbing property, not to have a stain, and to be able to dry quickly. Some of starches, which are well known, can be used therefor; starches having a particle diameter of 0.4 to 1.0 $\mu$m can be preferably used.

Since the polyvinyl acetate emulsion shows a transparency and the potato starch shows a semi-transparency after the emulsion gets dry, when a thin film made of the emulsion is formed on the surface of the balloon made of synthetic resin film, the images, the characters printed on the thin film can be displayed in a clear manner.

As the emulsion having an adhesive for the thin film according to the present invention, a polyvinyl acetate series (PVAc) emulsion, vinyl acetate ethylene copolymerizate (EVA), or a polyvinyl chloride series (PVC) emulsion can be preferable used. Alternatively, modified synthetic water-soluble adhesive, for instance, polyvinyl alcohol (PVA), polyamide acrylic (PAAm), polyvinyl pyrrolidone (PVP), vinyl acetate copolymerizate, acrylic series copolymerizate, and polyethylene oxide, can be used.

An additive assistant can be further added, which is necessary to form the thin film of the ink-state emulsion, to apply or spread the emulsion. Furthermore, a lubricant for controlling the viscosity of the thin film, an anti-foam agent used when the ink-state emulsion is prepared, or a preservative for preserving the ink-state emulsion should be added as an occasion demands.

The following Table 1 shows a comparison result where the following cases were compared: a printing was conducted on the thin film formed on the balloon surface which is obtained in accordance with the embodiment 2 of the present invention; a printing was directly conducted on the balloon made of synthetic film with the aid of a screen process printing; a printing was directly conducted on a surface of a rubber balloon.

TABLE 1

| Type of Balloon, Compared Items | Conventional method | | | Embodiment 2 |
|---|---|---|---|---|
| (1) Type of Balloon | Rubber Balloon | Wood Block | Screen Process Printing using Synthetic resin | Balloon made of synthetic resin film |
| (2) Printing means | Hand Printing with wood block with an ink for use in rubber balloons | Hand Printing or Screen Process Printing with synthetic resin block | Screen Process Printing | Printing by Printer |
| (3) Compared Items | | Comparison Results | | |
| a. Simple character, or picture (single color) | ○ | ○ | ◎ | ◎ |
| b. Simple character and picture (single color) | Δ | ○ | ◎ | ◎ |
| c. Complicated characters (two or more colors) | Δ | ○ | ◎ | ◎ |
| d. Complicated picture or characters and picture (two or more colors) | Δ | ○ | ○ | ◎ |
| e. Simple monochrome photo (single color) | Δ | ○ | ○ | ◎ |
| f. Complicated monochrome photo (single color) | X | Δ | Δ | ◎ |
| g. Simple full-color photo (single color), for instance, "Kaki" | X | X | X | ◎ |
| h. Complicated full-color photo (Primary color), for instance, "human's face · appearance" | X | X | X | ◎ |
| i. Gradation of photo or design | X | X | X | ◎ |
| j. Accuracy of the object to be printed | Δ | Δ | ○ | ◎ |

◎: Excellent
○: Good
Δ: Satisfactory
X: Poor

Next, the factor for determining the composition of the emulsion will be described. The Tables 2 to 4 show comparative examples where the composition of each emulsion is different to each other to experimentally determine the suitable composition of the emulsion.

TABLE 2

| | Embodiment | Compared Samples | | | |
|---|---|---|---|---|---|
| | | Comparison Examples | | | |
| Compared Items | 1 | A | B | C | D |
| Operativeness for Screen Process Printing, Adhesive of Thin Film | ◎ | ○ | ○ | ○ | X |
| Printing characteristics by Printer, Dryness, Stain, Gloss after Printing | ◎ | ◎ | ○ takes more time to get ink dry | ○ Gloss on Printing surface is fewer | X Ink does not get dry and shows stain |
| Water Resistance after Printing (Subjected Printed Portion to water from top for 5 min. after the portion gets dry) | ◎ | ◎ | ○ | Δ | X Printed Part does not stay |
| Evaluation | ◎ | ○ | ○ | Δ | X |

◎: Excellent
○: Good
Δ: Poor
X: Useless
-: Out of evaluation
NOTE:
No white pigment was used In Table 2, the comparative examples are compared to the embodiment 1. In the comparative example A, the ratio of the potato starch is changed to 4%; in the comparative example B, the ratio of the emulsion of the polyvinyl acetate is changed to 80%; in the comparative example C, the ratio of the emulsion of the polyvinyl acetate is changed to 60%; and in the comparative example D, a mixture of cyclohexanone (having a content of 50%) is added to 20% of a potato starch, which is not in a condition of emulsion, and mixed and stirred together is used.

As shown in Table 2, an experiment was conducted in a condition that the ratio of the polyvinyl acetate emulsion and the potato starch is changed in order to recognize the operativeness and adhesiveness when the thin film material is applied on the balloon with the aid of screen process printing. Then, another experiment was conducted to check the highest water absorbing ability in an effective range of the adhesiveness, in order to recognize the effective composition of the polyvinyl acetate emulsion, which determines the adhesiveness, and the effective composition of the potato starch, which determines the water absorbing ability. In the first embodiment, 10% of potato starch and 90% of water are mixed together, and the polyvinyl acetate emulsion (containing a water content 45% to 55%) is added.

It is not mentioned in the Table 2, however, in the embodiment 3, 10% of potato starch and 90% of water are mixed together, and the polyvinyl acetate emulsion (containing a water content 45% to 55%) is added; a ratio of the mixture of the potato starch and water and the polyvinyl acetate emulsion of 2:8; the same result as the first embodiment was obtained. Then it was recognized that the effect to have a preferred water absorbing ability and adhesiveness can be obtained in the range of these embodiments. It also was recognized that the comparative example D did not fit to the printable thin film to be formed on the balloon surface.

TABLE 3

|  | Compared Samples | | | | |
| --- | --- | --- | --- | --- | --- |
|  | Embodiment | Comparison Examples | | | |
| Compared Items | 2 | E | F | G | H |
| Ink Absorption in Thin Film | ◎ | X | Δ | X | X |
| Fidelity of color after the ink gets dry | ◎ | X Color fades and stain left | X Color little dark | X Color fades and stain left | X Color little dark |
| Fineness of Thin Film Surface | ◎ | X | X Poor than Embodiment | X | X |
| Settlement and Dispersion of Particles in Emulsion | ◎ | X Settled | X Settled | X Settled | X Settled |
| Evaluation | ◎ | X | X | X | X |

◎: Excellent
○: Good
Δ: Little Poor
X: Poor

In Table 3, the comparative examples E~H are compared to the embodiment 2. In the comparative example E the emulsion was used, obtained by mixing a clay for use in a coat paper manufacturing process to the polyvinyl acetate emulsion and stirring together; in the comparative example F, the emulsion was used, obtained by mixing a plaster of Paris powder to the polyvinyl acetate emulsion and stirring together; in the comparative example G, the emulsion was used, obtained by mixing an amazon carrion (clay powder) for use in a coat paper manufacturing procedure to the polyvinyl acetate emulsion and stirring together; and in the comparative example H, the emulsion was used, obtained by mixing a talc AS used in the coat paper manufacturing procedure to a water-base emulsion adhesive and stirring together. In these comparative examples, each powder and the emulsion were mixed together with a ratio of 3 to 7. The thin film was formed with the aid of a screen process printing in the comparative examples E, F, G and H.

As shown in Table 3, drawbacks were found in these comparative examples in each item. Particularly, the ink absorbing property of the film material, the degree of finish after the ink was dried, the stain, and the fineness of texture of the thin film were selected as the items to be compared.

It is not shown in Table 3, however the same result as the embodiment 2 was obtained concerning the embodiments 1 and 3. According to this experiment, it was recognized that the effect of the invention can be obtained in the range mentioned in these embodiments. Contrast thereto, drawbacks are recognized in the comparative examples E to H in all of the items to be compared, so that it was recognized that the comparative examples are not suite for forming the thin film on balloons.

TABLE 4

|  |  | Compared Items | | | | |
| --- | --- | --- | --- | --- | --- | --- |
| Samples | Compared Material | Adhesive to Balloon | Acceptability of Water Base Ink of Thin Film | Water Resistance of Thin Film | Easiness for Applying | Evaluation |
| Embodiment 1 | Polyvinyl Acetate | ◎ | ◎ | ◎ | ◎ | ◎ |
| I | Synthetic Rubber Latex | X | X Slow to get dry | ○ | X Difficult to adjust viscosity | X |
| J | Copolymerizate of Vinyl Acetate and Ethylene | ○ Little weak | ○ | ○ | X | X |
| K | Polyacrylic Ester | ○ | X | ○ | X | Δ |
| L | Polyvinyl chloride | ○ | ○ | ○ | X | Δ |

◎: Excellent
○: Good
Δ: Little Poor
X: Useless

In Table 4, experiments were conducted for the comparative examples I to L comparing to the embodiment 1 to check the adhesive property to the balloon surface, an acceptability of water-base ink, a water resistance, and easiness to apply the material to form a thin film on the balloon surface.

The samples for the experiment were obtained in such a manner that 10% of potato starch and 90% of water were mixed together and subjected to a heat treatment to have a first emulsion, then each material mentioned in the Table 4 is added to the first emulsion with the ratio of 7:3 to obtain a thin film material and the thus obtained thin film material is applied on a balloon to form a thin film thereon.

The material to be mixed to the first emulsion is: a synthetic rubber latex emulsion for the comparative example I, a polyvinyl acetate ethylene copolymerizate emulsion (EVA) for the comparative example J, a polyacrilic acid ester series emulsion for the comparative example K, and a polyvinyl chloride emulsion (PVC) for the comparative example L. These emulsions were mixed to the first emulsion and stirred together. In the Table 4, the thus obtained emulsions were compared to the embodiment 1 of the present invention.

As clear from the Table 4, the embodiment 1 shows an excellent result. The comparative examples I, J, K and L could not used to form a thin film on the balloon surface as they were.

It is not shown in the Table 4 that a similar experimental result was obtained in the embodiments 2 and 3 of the present invention, and thus it was recognized that a good result for the items could be obtained in the embodiments 1, 2 and 3. Further, it was recognized that the comparative example I is not suited for forming a thin film on balloons at all.

The nature of the thin film layer required in the present invention depends on the nature of the water-base ink used in the printers, or the system of the printer. It was recognized that the above-mentioned Composition 1 is suitable, from the points of the thickness of the thin film to be formed and a peel strength of the thin film, which are experimentally recognized in the ink jet type or the bubble jet type printers for use in computers, and the change of the shape of the thin film when the balloon itself is filled with gas.

The Method for Applying the Material to Form a Thin Film

In order to apply the material to form a thin film on the balloon surface, many methods, such as blowing, brush painting, heating roller, immersion, are available, and a suitable method should be selected as occasion demands. In the embodiments according to the invention, a screen process printing was used, because it shows good applicability and operability to form a thin film on the balloon surface.

An improvement of a macromolecular polymer emulsion to obtain a material suitable for the screen process printing will be explained below.

If an emulsion having an excessively high viscosity is used, the mesh for screen process printing is apt to be clogged. Even if the emulsion goes through the mesh, it is not effective because it becomes difficult to separate the mesh from the balloon surface.

Therefore, in order to improve the macromolecular polymer emulsion, it is desired to use a mixture of 10% of potato starch and 90% of water and heat the mixture at 64 to 67° C. to adjust the viscosity of the emulsion for screen process printing. The ratio of the potato starch and the water should be in a suitable range, i.e. 4% to 96%~20% to 80%, and mixed and subjected to a heat treatment. If the content of the potato starch is less than the lower limit, the water absorbing ability would be decreased, so that a stain would be caused and it becomes apt not to get dry. While, if the content of the potato starch is more than the upper limit, the viscosity of the emulsion becomes so high that an ink-state emulsion mostly suitable for the screen process printing could not be obtained. More preferably, the ratio of the potato starch and the water is 7% to 93%~13% to 87%.

However, the combination of the potato starch and the water shows a low peel strength of the thin film formed on the surface of the balloon. The adhesive strength thereof is very low so that when an adhesive cellophane tape is applied on the surface of the thin film and the tape is removed from the film, the film peels off.

Then a polyvinyl acetate emulsion (containing a water content of 55%) is added to the mixture of the potato starch and the water; the thus obtained thin film material is then applied on the outer surface of balloons to form a thin film which is printable with a water-base ink. As a result of adding the polyvinyl acetate emulsion, it was recognized that the adhesive property of the thin film was improved to a degree so that the film does not peels off from the balloon.

Since the thickness of thin film decides the power to absorb the water-base ink, the water absorption of the thin film was controlled by changing the mesh size of the nylon mesh for the screen process printing. By using a nylon mesh having a large mesh size, the thickness of the thin film conclusingly becomes thick; while, with the nylon mesh having a small mesh size, thickness of the thin film becomes thin. In the case of using the nylon having a small mesh, it is possible to make the texture of the thin film fine by forming thin films several times in a superimposed manner. As a result, it became possible to control the thickness of the thin film; thus many thin films having a different thickness could be obtained.

After drying the thin film formed on the outer surface of balloons, images, characters and combinations thereof were tried to be printed with the aid of an ink jet type printer and a bubble jet type printer with black ink, yellow and a color ink consisting of magenta and cyan; it was recognized that there was no stain or no color shading on the thin film and that there is no problem in a practical use, i.e. a water resident or a color deterioration after drying the thin film. The printing result of the characters etc. was very clear and beautiful, which can not be realized with the conventional technique. A remarkable effect was recognized in an easiness of printing, at low cost, and a lack of necessity for professional skill.

Recognition of the Function as a Balloon

An air-supporting experiment was conducted on balloons flared with Helium gas, which is generally used. As a result of comparing the air-supporting characteristic between the balloon having a thin film on the outer surface thereof and the balloons having no thin film, a decrease of air-supporting power is recognized in the balloons having a thin film. The reason therefor is that the weight of the thin film is added to the weight of the balloon itself, however it was recognized that this problem is easily solved by making the diameter of the balloon (diameter: 50 cm) larger by 20~30 mm.

The embodiment 1 was explained for the case that the thin film is directly formed on the balloon made of a synthetic resin film. However, the present invention is not limited to this embodiment. That is to say, it also is possible to form the thin film on a film sheet made of synthetic resin or a film sheet on the surface of which a metal is deposited in the same manner. By using such a film sheet, it is possible to print an images or designs on the thin film formed on the film sheet with a water base ink with the aid of a printer, and then the thus obtained printed film sheet is attached to the surface of the balloon. It should be noted that such a film sheet can be processed as a sticker or a label, which has an adhesive surface on one of the sides.

| Embodiment 2 | |
| --- | --- |
| Composition 2 | |
| Polyvinyl acetate emulsion | as described below |
| Potato starch | 30 g (10%) |
| Water | 270 ml (90%) |

Thin Film Material and Method for Forming the Thin Film

First Step: Potato starch 30 g (10%) was solved in 270 ml of water (90%); the mixture was heated to obtain a first emulsion.

Second Step: A polyvinyl acetate emulsion containing a water content of 45% to 55% was added to the first emulsion with a mixing ratio of 6:4 in weight; to the thus obtained polyvinyl acetate emulsion (containing a water content of 45% to 55%), the first emulsion was mixed and stirred.

Third Step: These emulsions were further stirred in a tank using a mixer for 20 to 25 minutes, so that no settlement phenomenon was caused due to the difference in mass of particles and then an ink-state emulsion having an excellent dispersing can be obtained. The thus obtained ink-state emulsion was applied on the outer surface of balloons with the aid of a screen process printing so as to form a thin film which is printable with a water-base ink after getting dry.

In the second embodiment, it is desired to have a composition of the potato starch and the water in a range of 4% to 96%~20% to 80%, and to heat the mixture to obtain the first emulsion. It is further desired to add the polyvinyl acetate emulsion to the first emulsion within a ratio of 6:4 to 8:2 in weight; then to form the thin film with the aid of a screen process printing. It was recognized that the thin film showed the same function and effect as those in the first embodiment.

Further, if the ratio of the polyvinyl acetate emulsion is less than 6, the peeling strength of the thin film would not be sufficient; and if the ratio is less, the film could not be used in practice. Contrary, in the case that the ratio of the polyvinyl acetate emulsion is greater than 8, the thin film would be sufficiently fixed to balloons, however, the ratio of the potato starch becomes low so that the film would not have a sufficient water absorbing property; and if the ratio of the polyvinyl acetate emulsion becomes more greater, not only the water absorbing property but also the acceptability of the water-base ink and the drying property of the ink would be deteriorated.

It is possible to form a thin film having a composition mentioned in the embodiments 1 and 2 on one of the surfaces of a film sheet, which has an adhesive on the other surface thereof. The thin film formed on one of the surfaces of the film sheet, any images or designs can be printed with a water base ink.

As a material for the film sheet, polyvinylidne chrolide, polyethylene terephthalate, etc. are preferably used. An experiment was conducted where PET was used as the material of the film sheet, the thin film was preliminarily formed on the film sheet; the film sheet was then attached to the balloon surface. On the other surface of the film sheet, an adhesive was preliminarily provided, therefore, it is possible to print an images or designs on the film sheet with the aid of a printer. A polyacrylic ester series adhesive was used as the adhesive on the film sheet. It should be noted that a release paper should be attached on the adhesive surface; when attaching the film sheet on the balloon, the release paper is then removed.

| Embodiment 3 | |
| --- | --- |
| Composition 3 | |
| Polyvinyl acetate emulsion | below mentioned |
| Potato starch | 30 g (10%) |
| Water | 270 ml (90%) |
| White pigment | 60 g |

Thin Film Material and Method for Forming the Thin Film

First Step: To potato starch 30 g (10%), 270 ml of water (90%) was added; the mixture was then heated and a white pigment was added at the same time; the mixture was then stirred until the temperature reached 67° C. to obtain a first emulsion.

Second Step: To a polyvinyl acetate emulsion (containing 55% water), the emulsion obtained at the first step was added with a ratio of 80% to 20%; the materials were mixed and stirred to have a second emulsion for forming a thin film.

Third Step: These emulsions were further stirred in a tank using a mixer for 20 to 25 minutes; no settlement phenomenon was caused due to the difference in the mass of particles and then an ink-state emulsion having an excellent dispersing quality could be obtained. The thus obtained ink-state emulsion was applied on the outer surface of balloons with the aid of a screen process printing so as to form a thin film, which is printable with a water-base ink after getting dry.

In the third embodiment, the composition of the polyvinyl acetate emulsions was changed. However, it is desired to keep the composition of the potato starch and the water in a range of 4% to 96%~20% to 80%. If the composition of the potato starch is smaller than this range, the water absorbing property of the thin film becomes low, which would cause a stain or a problem that the film would not get dry. While, if the composition of the potato starch is greater than the range, the viscosity of the emulsion becomes so high that an optimum ink-state emulsion for screen process printing would not be obtained. Further, it is much more preferred to make the ratio of the potato starch and the water 7% to 93%~13% to 87%.

In each embodiment, the emulsion was prepared in first and second steps. The two-stage preparation prevents troubles, which are apt to be caused when the thin film is formed with the aid of a screen process printing. That is to say, there is a mass difference among the particles of potato starch crystals due to the different particle diameter thereof. Therefore, when the particles settle down, there would be a difference in the settling time so that a homogeneous thin film is not apt to be obtained. According to the present invention, the thin film material has an optimum viscosity to prevent a difference in the settling of the particles so as to obtain a homogeneous thin film.

In the third embodiment, since the white pigment was mixed at the first step, the thin film becomes non-transparent and then the light is not reflected from the balloon surface.

As the white pigment, kaolin clay used; an additive, such as sodium bicarbonate, and aluminum hydroxide, can be added as an occasion demands. The pigment was homogeneously dispersed when the thin film is formed; the pigment contributes to the viscosity of the emulsion, to adjust flowability of the emulsion, and to give water retention to the emulsion.

Since the polyvinyl acetate emulsion has a transparency and the potato starch has a semi-transparency after the thin film gets dry, the reflection from the synthetic resin film or the metal deposited film, which is the material of balloons, can be prevented by adding a white pigment. As a result, the image or characters can clearly appear on the printing surface of the thin film. The transparency and the degree of whiteness of the thin film is determined depending on the concentration of the white pigment. Therefore, a better printing result could be obtained in comparison to the case where no white pigment was added.

Furthermore, the white pigment gives white gloss, non-transparency, and smoothness to the printable surface of the thin film, which is printable with a water-base ink; the whiteness of the thin film is determined by the amount of the white pigment. Other colored pigments may be added to the white pigment, or other colored pigments may be individually used as occasion demands.

In addition to this, a pigment dispersing agent may be added, or another additive agent as mentioned in the first embodiment may also be added, which is desired to be used to apply and spread the ink-state emulsion on the surface of the balloons.

Furthermore, a lubricant for controlling the viscosity of the emulsion, as an anti-foam agent used when preparing the ink-state emulsion, a dying material for emphasizing the whiteness, and a preservative for keeping the condition of the ink-state emulsion may be added as occasion demands.

According to the third embodiment, a thin film having a higher whiteness was obtained, in comparison to the first embodiment; the thin film was formed with the aid of a screen process printing.

Embodiment 4

FIGS. 4 to 6 are schematic views for explaining the printing steps to print images or designs on a balloon 11 made of a synthetic resin film using an assistant guide paper 9 for printing. Balloons made of synthetic resin film are composed of two films; the total thickness of the films is about 58 to 62 $\mu$m; that is very thin.

Balloons generally have a round shape or a heart-like shape, so that it is difficult to print an image or design there in the condition as they are. According to the embodiment explained below, this problem can be solved.

FIG. 6 shows a balloon to which an assistant guide paper for printing is attached in order to print an images or designs on the printing portion 5 in an effective manner. On the printing portion of the balloon body 11, the thin film is preliminarily formed. FIG. 4 shows a step, which is prior to the condition shown in FIG. 6, where the peripheral portions 17, 18 and 19 of the balloon body are folded along the sides 14, 15 and 16 of the assistant guide paper 9. FIG. 5 illustrates a condition where a plurality of thin detachable adhesive tapes are provided in order to fix the folded portions of the balloon to the assistant guide paper 9. It should be noted that the paper 9 has a thickness a little thicker than that of copy paper.

More concretely, for a round balloon having a diameter of 50 cm, a paper having an "A3" size can be used as the assistant paper. In this case, printing was easily conducted by inserting the paper and the balloon into the printer manually in the direction shown by an arrow. However, the present invention is not limited to this embodiment.

According to the invention, a full color printing on the balloon surface becomes available with the aid of a printer for use in computers, which has been considered impossible according to the conventional method.

Further, according to the invention, the advantages can be realized that the printed image is not deteriorated, the user's own requirements can be realized; the cost for printing is low, many kinds of image can be printed on even a small number of balloons. In the Table 1, there is mentioned a detailed comparison between the cases that a conventionally known screen process printing was applied to the conventional rubber balloons and to the balloons made of synthetic resin film.

In Table 1, (1) balloons made of rubber, balloons made of synthetic resin having no film, and balloons having a thin film thereon according to the second embodiment are compared; (2) the different printing method was conducted in each example; (3) the printed results are shown as a test result.

The particulars are shown in Table 1; on rubber balloons only a simple character, or a picture could be printed, but the printed surface becomes thin along with the inflation of the rubber material, so that there was no clearness in the printed image and no function and effect of the invention could not be obtained.

The printing was also tried directly on conventional balloons made of synthetic resin, which are also used in the present invention, having no thin film, however, the printers for use in computers could not be used due to the fact that the surface of the synthetic resin film has a repellency.

Therefore, on the conventional balloons, a printing was conducted with the screen process printing so as to obtain a better printing result. In Table 1, the printing result is mentioned; f. the printing quality was decreased for a complex mono-color (one color) photo; g. a printing for a simple full-colored photo (primary color), for instance, the case that a photo of "Kaki" is printed on the balloon, or h. a printing for a complex full-colored photo (primary color), for instance, the case that a photo of "face of human being and expression thereon" is printed on the balloon, where many colors are required, it could not be used because of the quality of printing.

Contrary to this, according to the embodiments of the present invention excellent results were obtained in all of the items, which shows the great function and effect of the present invention.

It is not mentioned in Table 1, but should be noted that an economical superiority was also recognized in the present invention.

Embodiment 5

Composition

| Embodiment 5 | | |
|---|---|---|
| Composition | | |
| For emulsion A | polyvinyl acetate emulsion | 700 g |
| | potato starch | 30 g (10%) |
| | water | 270 ml (90%) |
| For ink containing an | white pigment | 20% |
| oil binder | oil binder | 80% |

Preparation of Thin Film Material

Emulsion A:

First step: To 30 g of potato starch (10%), 270 ml of water (90%) was added and then stirred until the temperature became 67° C. to obtain a first emulsion.

Second step: To a polyvinyl acetate emulsion (containing a water content of 55%), the first emulsion obtained at the first step was added with a ratio of 80%:20%, then mixed and stirred to obtain an emulsion A for an upper layer film. By further starring the emulsion A for 20~25 minutes in a mixer, an ink-state emulsion having an excellent dispersing property can be obtained, which does not cause a settling phenomenon due to the difference in the mass of particles. The thus obtained ink-state emulsion was applied on the lower layer film mentioned below for several times, i.e. 1 to 4 times, with the aid of screen process printing to obtain an upper layer film and made it dry to obtain the film, which has a function and effect of the present invention.

It is desired to make the ratio between the potato starch and the water 4% to 96%~20% to 80%. The same as in the first embodiment, when the content of the potato starch is less than the ratio, the water absorbing ability of the film becomes low, which causes stains or makes it difficult to get dry. While, when the content of the potato starch is more than the ratio, the viscosity of the emulsion becomes so high that an optimum ink-state emulsion for screen process printing cannot be obtained. Further, it is much more desirable to make the ratio of the potato starch and the water 7% to 93%~13% to 87% in order to obtain a more effective emulsion.

In each embodiment, the emulsion was prepared in first and second steps. The two-stage preparation prevents troubles which are apt to be caused when the thin film is formed with the aid of a screen process printing. That is to say, there is a mass difference among the particles of potato starch crystal because every particle has a different particle diameter. Therefore, when the particles settle down, there would be a difference in settling time so that homogeneous thin film cannot be obtained. According to the present invention, since the thin film material has an optimum viscosity to prevent the settling of the particles a homogeneous thin film can be obtained.

As the composition of the emulsion A, the material can be selected and used in the same range mentioned in the first embodiment.

An Ink Containing An Oilness Binder:

As the oilness binder mentioned above, a binder containing cyclohexane was used. To the binder, i.e. the cyclohexane, was added a white pigment with a ratio of 80% to 20% and stirred together to obtain an ink containing an oilness binder. The desired mixing ratio of the oilness binder and the white pigment is in a range of 85% to 15%~70% to 30%. When the content of oilness binder is more than the ratio, the whiteness on the surface of the film becomes not to be sufficient, while the content is less than the ratio, the smoothness on the surface of the film would be lost.

Method for Forming a Thin Film

The Lower Layer Film:

The thus obtained ink containing oilness binder was further stirred in a mixer for 20 to 25 minutes to obtain an ink containing oilness binder having an excellent dispersing property.

The thus obtained ink containing oilness binder was applied on the outer surface of balloons to form a lower layer film, and then the emulsion A was further formed on the lower layer film to form an upper layer film with the aid of a screen process print; after the film got dry, the thin film, which is printable with a water base ink, was formed on the balloon surface.

The Method for Applying the Thin Film:

For the Lower Layer Film:

The ink containing oilness binder was applied once on the balloons with the aid of screen process printing. Once was enough to form the lower layer, so the ink was applied once to form the lower layer film in the present embodiment. At this stage, the thickness of the film became to 1.2 $\mu$m.

The reason for combining the white pigment and the oilness binder to obtain the lower layer film was: if only the upper layer film is used, the adhesive power would be remarkably decreased due to the dirt on the surface of the balloons or the change of the surface with time. The lower layer film obtained by combining the white pigment and the oilness binder functions as a base for forming an upper layer. film without causing a decrease of the adhesive power even the surface of the balloon has been changed. It was recognized that the function and effect of the upper layer film mentioned below is obtained as a result of the existence of the lower layer film.

How to Apply the Upper Layer Film:

It is desired to apply the emulsion A on the lower layer film made of the ink containing an oilness binder with the aid of screen process printing. It is desired to apply the emulsion A three or four times; in the present embodiment, the emulsion A was applied three times after the first application of the emulsion gets dry. After the film got dry, a thin film having a high transparency was formed due to the existence of the polyvinyl acetate contained in the material. At this stage, the thickness of the thin film became about 7 $\mu$m.

Since the thin film contains a material having a high transparency, such as polyvinyl acetate, it was recognized that a film effect having a high transparency appears on the balloon surface. That is to say, the whole amount of the water base ink supplied from the printer was accepted in the upper layer film and the ink was reflected by the lower layer film, so that the color transmits through the transparent upper layer film and then clearly appears on the surface of the balloon.

From this point of view, the thin film in this embodiment is different from the thin film according to the embodiment 3, where the emulsion was obtained by simply mixing the polyvinyl acetate, the potato starch and the white pigment.

In the thin film according to the embodiment 3, the water base ink is dispersed on the surface of the thin film and the white pigment is also dispersed when the printing is conducted by a printer, so that the images or designs appears in a faded manner. Therefore, the embodiment 5 is preferably used for printing images where the color, the line, the border, etc. should be printed in a clear manner; while the embodiment 3 is for faded images, for instance, a landscape photo in a foggy atmosphere.

Figure 7:
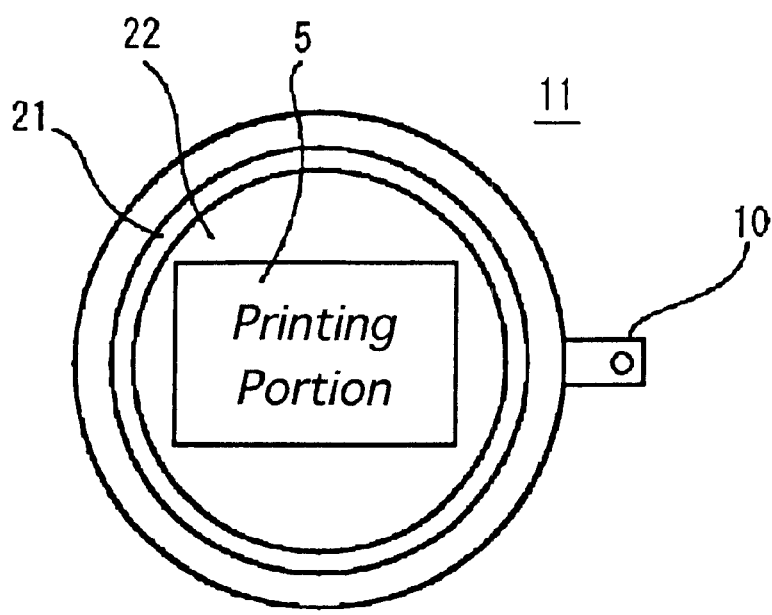
FIG. 7 is a plan view illustrating a balloon made of synthetic resin film where a thin film is formed.

In FIG. 7, both the upper layer film 22 and the lower layer film 21 are formed on the outer surface of the balloon 11. As is clear from the FIG. 7, the lower layer film 21 has a larger size than that of the upper layer film 22. For instance, on the round balloon shown in FIG. 8, the lower layer film 21 has a size about 5 mm larger than that of the upper layer film 22. Practically, the difference in size may be in a range of 3 to 10 mm. The difference is made taking the deviation when applying the upper layer into consideration three times.

Further, the repeated application of the emulsion A when applying the upper layer film influences to the finish of the printing after the water-base ink is absorbed and gets dry. Particularly in case of the full-color printing, the water-base ink is absorbed in the layer of the emulsion A only. According to the embodiment 5, more excellent result was obtained in comparison to the embodiments 1 to 3 in the points of the fidelity of color after the ink gets dry, the appearance of color, and the fineness of texture of the thin film, etc. It is considered that the concentration of the printing ink in the upper layer film 22 contributes to the excellent result. It was further recognized that since the printing ink is reflected by the lower layer film 21 the person who sees the balloon can catch the border of the image more clearly.

The emulsion A contributes to the adherence of the upper layer film to the lower layer film due to the existence of the polyvinyl acetate emulsion. Further, the polyvinyl acetate emulsion has a function to make the upper layer film almost transparent when the film gets dry, so that the color development and the gloss of the image printed on the upper layer film are emphasized and then the line and the border of the image becomes more clear.

The emulsion for forming a thin film is selected so as to have the same characteristics in the viscosity, the particle diameter, and the adhesive property to the balloon surface to those of the first embodiment.

Any starch other than the potato starch can be used for preparing the emulsion A.

Emulsions other than the polyvinyl acetate series emulsion may also be used, for instance, emulsion consisted of vinylacetate•ethylene copolymerizate (EVA) or polyvinyl chloride series (PVC) emulsion. Further, instead of the emulsion adhesive, improved synthetic water soluble adhesive, for instance, polyvinyl alcohol(PVA), polyacrylamide (PAAm), polyvinyl pyrrolidone (PVP), vinyl acetate copolymerizate, acrylic series copolymerizate, polyethylene oxide (PEO), may be used.

Furthermore, additive agents may be added, which is required when the thin film is formed by applying or spreading the ink-state emulsion A on the balloon surface. Furthermore, lubricates for controlling the viscosity of the emulsion when the thin film is formed, anti-foam agent when the emulsion is prepared, or antiseptic for preserving the ink-state emulsion may be added as occasion demands.

TABLE 5

| Compared Items | Embodiment 3 | Embodiment 5 |
| --- | --- | --- |
| Ink Absorb Function in Thin Film | Spread Absorbed | Absorbed only in the Upper Layer Film |
| Color Fidelity after Water Base Ink is absorbed and gets dry | ◯ Good, but half-transparency is recognized | Excellent, Transparency is recognized |
| Color Appearance | ◯ Ink fades little | Ink concentrates in the Upper Layer Film, very clear color appearance is obtained |
| Fineness of Surface of Thin Film | ◎ | ◎ |
| Settlement, Dispersing of Particles in Emulsion | ◎ | ◎ |
| General Evaluation | ◯ | ◎ |

◎: Excellent
◯: Good

In Table 5, the present embodiment 5 and the embodiment 3 are compared. It is understood from the Table 5 that a fidelity of the color was recognized after the water base ink was absorbed and got dry in accordance to the embodiment 5 in comparison to the embodiment 3, because of the transparency on the surface of the thin film. It is considered that this effect came from that the ink is concentrated in the upper layer film so that very clear color effect can be obtained.

Further, according to the embodiment 5, the fineness of the texture of the thin film, the settling and dispersing property of the particles contained in the emulsion were also excellent as well as the embodiment 3.

Embodiment 6

Figure 8:
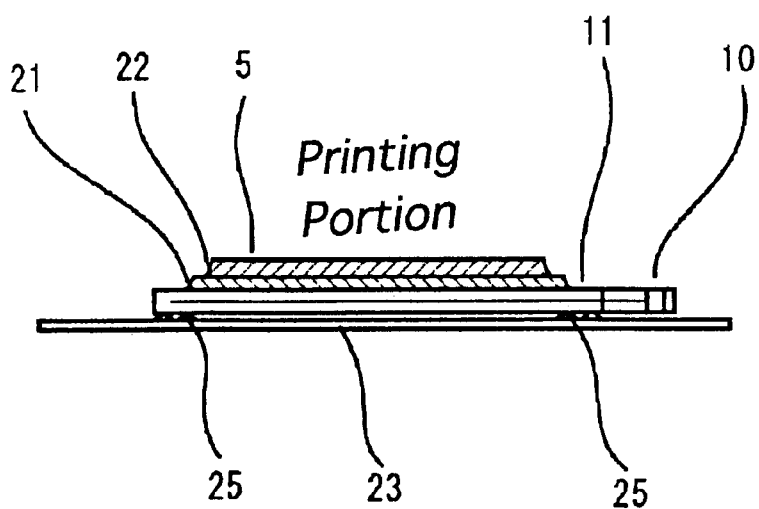
FIG. 8 is a cross-sectional view representing a condition of a balloon made of synthetic resin film with an assistant paper for printing.
Figure 9:
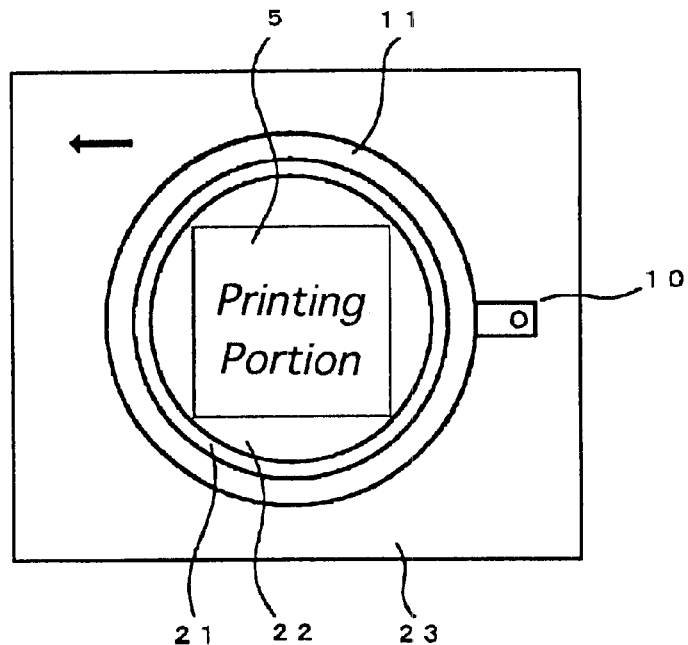
FIG. 9 is a plan view showing the balloon made of synthetic resin film in FIG. 8.

Embodiment 6 will be explained referring to the attached drawings. FIGS. 8 to 12 are schematic views for explaining the assistant guide paper, which is used when an images or designs is printed on balloons made of synthetic resin film. FIG. 8 is a cross sectional view showing a condition that the assistant guide paper is attached to the balloon made of synthetic resin film; FIG. 9 is a plan view of the balloon shown in FIG. 8.

Figure 10:
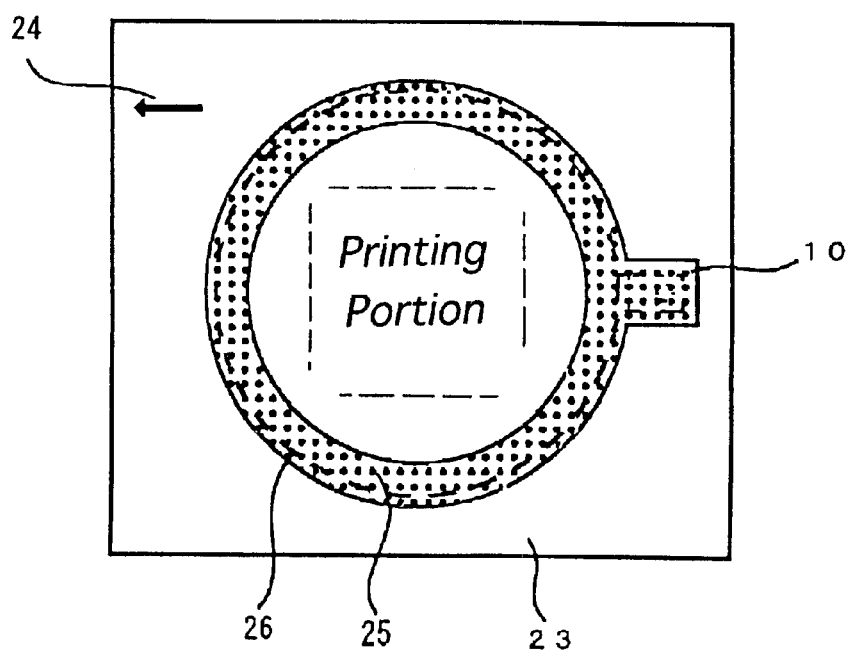
FIG. 10 is a plan view depicting a balloon made of synthetic resin film with an assistant paper for printing, where an adhesive layer is formed.
Figure 11:
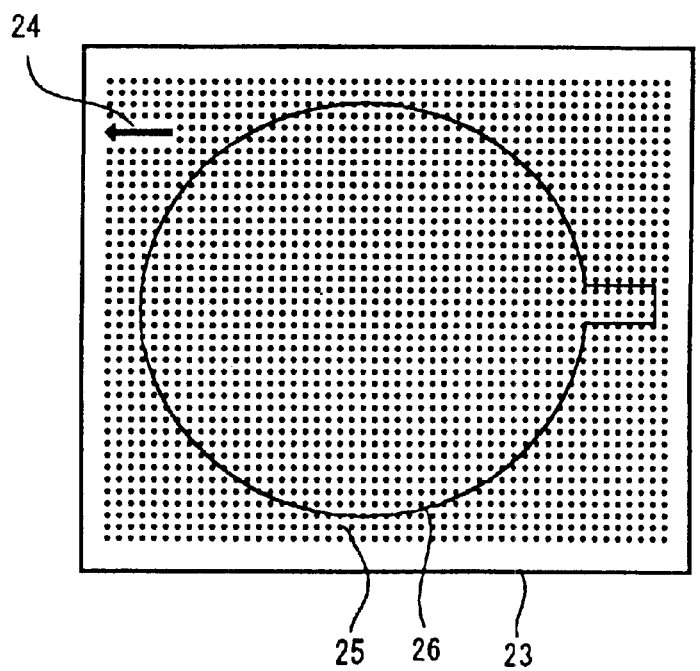
FIG. 11 is a plan view illustrating an assistant paper for printing, on a part of which an adhesive layer is formed.
Figure 12:
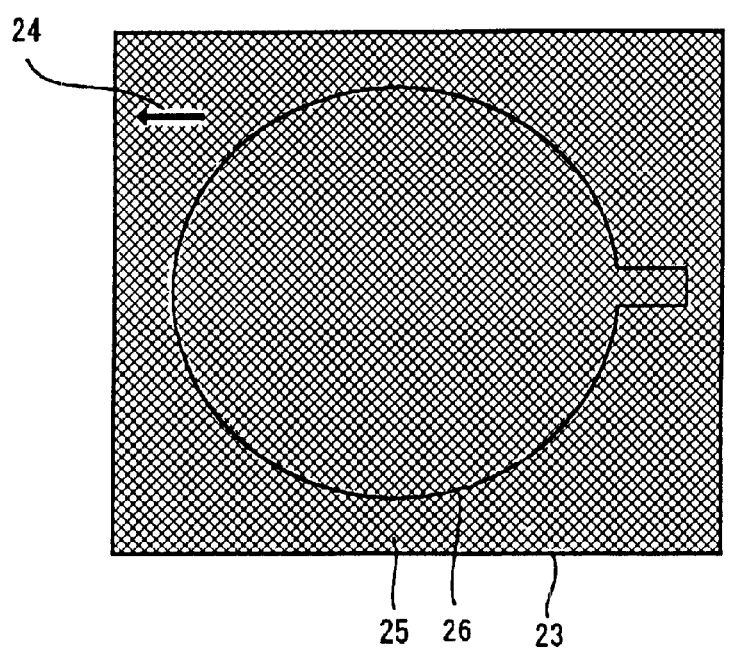
FIG. 12 is a plan view representing an assistant paper for printing, on a whole surface of which an adhesive layer is formed.

FIGS. 10 to 12 are schematic views illustrating the assistant guide paper itself which is used when an image is printed on the balloon made of synthetic resin film. FIG. 10 shows a condition that an adhesive layer is provided on the assistant guide paper where the balloon should be located; FIG. 11 illustrates a condition that an adhesive layer is partially provided on the assistant guide paper; FIG. 12 depicts a condition that an adhesive layer is provided on the whole area of the assistant guide paper.

The assistant guide paper according to the embodiment 6 can also be applied to the balloons according to the other embodiments.

The assistant guide paper is used to efficiently print an images or designs on the printing portion 5 of the balloon, when the thin film is preliminarily formed. The condition that the balloon is mounted on the assistant guide paper 23 is shown in FIGS. 8 and 9.

As shown in FIG. 10, the adhesive layer 25 is previously provided on the assistant guide paper 23. As the adhesive agent, for instance, adhesive agent ORIBAIN BPW-5361 made by Toyo Ink Manufacturing Co., Ltd. could be suitably used.

The adhesive layer 25 is provided with the aid of a screen process printing technique, etc. so as to correspond to the outer peripheral shape 26 of the balloon body 11. The adhesive agent should be provided to the assistant guide paper in accordance with the size of the balloon to be attached in order to fix the balloon to the paper in an efficient manner. This process can be done automatically. It is desired that the assistant guide paper 23 has almost the same thickness of copy paper or thicker than copy papers. Paper or thin plastic film can be used to fix the balloon in a good manner.

In order to easily detach the balloon after the printing has been done, the adhesive layer 25 has a circular shape in this embodiment, however, the shape of the adhesive layer is not limited to this shape. In FIG. 11 the adhesive layer is formed on the surface of the paper except for the peripheral portion thereof, in FIG. 12 the layer is formed on the whole surface of the paper. The adhesive layer 25 may be formed in these areas in a hatched or dotted state. It may be possible to use a rolled paper for the assistant guide.

Further, it may be possible to provide the adhesive layer 25 on both sides of the assistant paper, which is used for double-side printing. The adhesive layer is suitably provided on the assistant guide paper 23 in dots, lines, or meshes. The printing is proceeded in such a manner that the peripheral portion 26 of the balloon is attached to the adhesive layer 25 on the assistant guide paper 23, the balloon and paper are inserted into an ink jet type printer together in a direction 24 shown by the arrow.

More concretely, for the balloon having a diameter of 18cm, a circular shaped adhesive layer 25 is formed on an A4 size paper (length 297 mm, width 210 mm). It is preferred to provide a colored adhesive agent so as to be able to easily read the position of the adhesive layer 25, or to provide a mark for printing is added to show the portion where the balloon is attached. Then, the peripheral portion of the balloon is brought into contact to the assistant guide paper 23.

Printing was easily conducted by inserting the paper and the balloon together in a direction of the arrow 24 manually or using a cassette case. It may be also possible to provide the adhesive layer 25 on the assistant guide paper 23 partially or as a whole.

Since the balloon is arranged such that the printing portion 5 can be set to face the printing surface in the printer, the balloon runs through the printer in good manner and a clear print is available. In addition to this, printing troubles can be prevented.

Furthermore, for the balloon made of synthetic resin film on the outer surface of which a thin film material is applied so as to be able to print thereon with a water-base ink, even if the balloon is bigger than the assistant guide paper, it is possible to fix the balloon on the paper by folding the peripheral portion of the balloon. For this purpose, it is preferred to use an assistant guide paper on both sides of which an adhesive layer is provided. The way to fold the balloon and to attach the balloon to the assistant guide paper is shown in FIG. 5.

Industrial Applicable Field

According to the invention mentioned in claim 1, balloons made of synthetic resin film is can be obtained on the outer surface of which a thin film, which accepts a water base ink and then printable with a water base ink, is formed; the thin film using polyvinyl acetate emulsion, water and a starch. According to the invention, it becomes possible to print an images or designs on the balloon in a clear and excellent manner with the aid of a printer, which is generally used in personal computers. Therefore, the drawbacks of the conventional way to print an images or designs on balloons made of synthetic resin film, i.e. the block printing work with an expensive cost and the printing cost, etc. can be solved; a clear and excellent full-color printing can be then realized with a low cost.

According to the invention mentioned in claim 2, by using a polyvinyl acetate emulsion, water, a potato starch and a white pigment, a balloon made of synthetic resin film can be obtained, on the outer surface of which a white thin film, which is printable with a water base ink, is formed.

Further, according to the method of the invention, a balloon made of synthetic resin film can be manufactured on the outer surface of which a thin film which is printable with a water base ink is formed. According to the invention mentioned in claim 22, a balloon fixed on an assistant guide paper is provided, so that a clear and excellent printing is effectively available on the balloon with the aid of a printer for use in personal computers. Furthermore, according to the manufacturing method mentioned in claim 23, balloons having a thin film, which is printable with the aid of a printer for use in personal computers, can be effectively manufactured by fixing the balloon to the assistant guide paper.

According to the invention, a fine printing with primary colors can be conducted on the outer surface of balloons made of synthetic resin film, which is hydrophobic and inherently does not accept the water-base ink used in a printer for computers. Moreover, images or designs which are taken into a scanner or a digital camera can also be printed out on the balloon surface with a clear and excellent full color, using a printer for use in computers with an epochal low cost.

In addition, by the fact that an image or a design can be printed on the plain outer surface of balloons made of synthetic resin film in a clear and excellent manner using a printer for use in personal computer, the following points are improved.

(1) When processing plain color balloons according to the order of a customer, a screen process printing has been conventionally used; therefor printing displacement was apt to be caused and it was very difficult or impossible to conduct a printing process of complex characters or picture, a full-color image with graduation, etc. on the balloon (2) In the balloon made of synthetic resin films having a thin film according to the invention, the image is printed on the film with the aid of a printer for use in computers, therefore, it is not necessary to dissolve the image into primary colors or to have printing blocks; the draft is taken into a scanner and can be printed out on the balloon by the printer for use in computers.

(3) According to the invention, the fixing property of ink is better, the color deterioration is less, the peel strength is higher, the safety of products is better in comparison to the conventional screen process printing.

(4) The processing time for printing images on balloons can be shortened.

(5) A skilled technique is not required to print images on balloons made of synthetic resin film; it is possible for anybody who can operate a personal computer to conduct the printing.

(6) In addition to the above, the plate making work and the expensive printing cost are not necessary when printing is conducted on balloons made of synthetic resin film; even for the demand with small amount and several kinds of printing, a clear and excellent full color printing can be offered with an extremely low cost.

As stated above, so many effects can be found in the present invention. The effect of the invention was realized, particularly in the comparison mentioned in Tables 1 to 4.

The fact that there is no need of plate making brings an effect that different kinds of printing with small amount can be conducted economically. For instance, a clear and excellent print can be offered for the "POP" in a shop or in front of a shop, or for balloons for use in sales promotions. While, for the people who are in charge of advertising or promoting, it becomes possible to print very easily and quickly images or designs on balloons with the aid of a printer for use in computers in a clear and excellent manner as occasion demands.

In one of the embodiments, both the upper layer film and the lower layer film are formed on the balloon surface. Therefore, the drawback that the adhesive force of the thin film decreases due to the dirt on the surface of balloons or the change in time, which is caused in a situation that only a single layer film formed, is dissolved. By using the lower layer film, the decrease of the adhesive force of the thin film due to the change on the surface of the balloon can be prevented and the upper layer film can be formed in a good manner.

Particularly, by using a polyvinyl acetate, the thin film having a high transparency can be formed on the balloon, so that the whole amount of the water base ink coming from the printer is accepted in the upper layer film and the color of the ink is reflected by the lower layer film; a clear color appears on the balloon surface, transmitted through the transparent film.

Comparing the case that an emulsion made from polyvinyl acetate, potato starch, white pigment is applied to form the thin film and in the case that an emulsion, where no white pigment is included in the upper layer film as mentioned in the embodiment 5, is applied; in the former case, the water base ink is spread over the surface of the thin film during the printing process, and the white pigment is spread on the thin film as well, so that the color appears there in a slightly faded manner, while in the latter case, the upper layer film becomes almost transparent after the film gets dry, the color appearance, and gloss on the printed surface are enhanced on the upper layer film, and then the line or the border of image becomes more clear. Particularly from the point of view of the fidelity to transfer the color after the ink is absorbed and gets dry, a transparency was recognized on the surface of the film. It is considered that this is caused in that the ink is concentrated in the upper layer film, showing a clear color effect.

The present invention is not limited to the embodiments explained in the above. The balloon is arranged such that the printing portion 5 of the balloon can be set so as to face the printing running surface of the printer, using the assistant guide paper 9. Therefore, the balloon goes through the printer smoothly to print the images or designs clearly, preventing printing troubles.

In case that the adhesive agent is provided on the assistant guide paper, the peripheral portion of the balloon can be efficiently fixed to the assistant guide paper, so that mass production and automated production of printed balloons can be realized. According to the invention mentioned in claim 35, an adhesive agent layer having a shape corresponding to the shape of a balloon, for instance, a circular shape, is provided on the assistant guide paper. Therefore, the peripheral portion of the balloon can be fixed to the assistant paper very efficiently and then a mass production effect can be realized with the aid of a printer.

The conventional printing method for balloons, which are ready made and have a plain color, is not inherently suitable before discussing the quality of printing; the present invention provides a novel printing method for printing images on the surface of the balloons made of synthetic resin films; according to the method a clear and beautiful printing result can be obtained. Further, according to the method for printing images on the surface of the balloons using an assistant guide paper, the portion to be printed is set so as to face the running surface of the printer, so that the balloon can go through the printer smoothly and a clear printing is available; printing troubles can be prevented.

What is claimed is:

1. A balloon made of a synthetic resin film comprising a first coating formed on an outer surface of said balloon, the first coating comprising a polyvinyl acetate emulsion, water and a starch, and the first coating being able to be printed on with a water-base ink.

2. A balloon made of a synthetic resin film according to claim 1, wherein the first coating further comprises a white pigment, and wherein said starch is a potato starch.

3. A balloon made of a synthetic resin film comprising a first coating formed on an outer surface of said balloon, the first coating comprising an adhesive in an emulsion state, water and a starch, and the first coating being able to be printed on with a water-base ink.

4. A balloon made of a synthetic resin film according to claim 3, wherein said first coating further comprises a white pigment, and wherein said starch is a potato starch.

5. A balloon made of a synthetic resin film comprising a first coating formed on an outer surface of the balloon, the first coating comprising a first emulsion and a polyvinyl acetate emulsion; said first emulsion comprising a potato starch and water with a ratio of between 4:96 and 20:80; and said polyvinyl acetate emulsion comprising a water content of 45% to 55%; and wherein said first coating is able to be printed on with a water-base ink, and is formed with the aid of screen process printing.

6. A balloon made of a synthetic resin film comprising a film sheet having an advisee surface and attached on an outer surface of the balloon, and a first coating formed on the a surface of said film sheet; wherein said first coating is able to be printed on with a water-base ink and comprises a first emulsion and a polyvinyl acetate emulsion; said first emulsion comprising a white pigment and a mixture of a potato starch and water mixed with a ratio of between 7:93 and 3:87; wherein said first emulsion is subjected to a heat treatment; said polyvinyl acetate emulsion comprising a water content of 45% to 55%, and wherein said polyvinyl acetate emulsion and said first emulsion are mixed together with a ratio of between 6:4 and 8:2 to obtain said first coating.

7. A balloon made of synthetic resin film comprising a first coating formed on an outer surface of said balloon, said first coating comprising a first emulsion and a polyvinyl acetate emulsion; said first emulsion comprising a potato starch and water with a ratio of between 7:93 and 13:87; wherein said first emulsion is subjected to a heat treatment; said polyvinyl acetate emulsion comprising a water content of 45% to 55%; wherein said polyvinyl acetate emulsion and said first emulsion are mixed together with a ratio of 70:30 to obtain said first coating; and wherein said first coating is able to be printed on with a water-base ink, and is formed on the balloon surface with the aid of screen process printing.

8. A balloon made of a synthetic resin film comprising a first coating formed on a surface of a film sheet; a first emulsion and a polyvinyl acetate emulsion; said first emulsion comprising a white pigment and a mixture of a potato starch and water mixed with a ratio of between 7:93 and 13:87; wherein said first emulsion is subjected to a heat treatment, and said polyvinyl acetate emulsion comprising a water content of 45% to 55%, and wherein said polyvinyl acetate emulsion and said first emulsion are mixed together with a ratio of between 6:4 and 8:2 to obtain said first coating, wherein said first coating being able to be printed, on with a water-base ink.

9. A method for manufacturing a balloon made of a synthetic resin film comprising a first coating on an outer surface of said balloon, said method comprising the steps:

Adding water to a starch to obtain a mixture and subjecting the mixture to a heat treatment to obtain a first emulsion;

Adding a polyvinyl acetate emulsion to the first emulsion and mixing and stirring said polyvinyl acetate emulsion and said first emulsion to obtain a second emulsion; and Applying the second emulsion to form said first coating on the outer surface of the balloon, wherein said first coating is able to be printed on with a water-base ink.

10. A method for manufacturing a balloon made of a synthetic resin film according to claim 9, further comprising adding a white pigment to the mixture to obtain said first emulsion, and wherein said starch is a potato starch.

11. A method for manufacturing a balloon made of a synthetic resin film comprising a first coating on an outer surface of said balloon, said method comprising the steps:

Adding water to a potato starch with a ratio of between 4:96 and 20:80 to obtain a mixture and beating the mixture to a temperature between 64 to 67° C. and stirring the mixture to obtain a first emulsion;

Adding a polyvinyl acetate emulsion to the first emulsion and mixing and stirring said polyvinyl acetate emulsion and said first emulsion to obtain a second emulsion; and Applying the second emulsion to form said first coating on said outer surface of the balloon, wherein said first coating is able to be printed on with a water-base ink.

12. A method for manufacturing a balloon made of a synthetic resin film comprising a first coating on an outer surface of said balloon, said method comprising the steps:

Adding water to a potato starch with a ratio of between 4:96 and 20:80 to obtain a mixture and heating the mixture to a temperature of 67° C. and adding a white pigment and string the mixture to obtain a first emulsion;

Adding a polyvinyl acetate emulsion to the first emulsion and mixing and stirring said polyvinyl acetate emulsion and said first emulsion to obtain a second emulsion; and Applying the second emulsion to form said first coating on the outer surface of the balloon, wherein said first coating is able to be printed on with a water-base ink.

13. A method for manufacturing a balloon made of a synthetic resin film comprising a first coating on an outer surface of said balloon, said method comprising the steps:

Adding water to a potato starch with a ratio of between 7:93 and 13:87 to obtain a mixture and heating the mixture to a temperature of between 64 to 67° and stirring the mixture to obtain a first emulsion;

Adding a polyvinyl acetate emulsion comprising a water content of 55% to the first emulsion with a ratio of 70:30 and making and stirring said polyvinyl acetate emulsion and said first emulsion to obtain a second emulsion; and Applying said second emulsion with the aid of a screen process printing to form said first coating an said outer surface of the balloon, wherein said first coating is able to be printed on with a water-base ink.

14. A method for manufacturing a balloon made of a synthetic resin film comprising a first coating on an outer surface of said balloon, said method comprising the steps:

Adding water to a potato starch with a ratio of 10:90 to obtain a mixture and heating the mixture to a temperature of 67° C. and adding a white pigment and stirring the mixture to obtain a first emulsion;

Adding a polyvinyl acetate emulsion comprising a water content of 55% to the first emulsion with a ratio of 70:30 and mixing and stirring said polyvinyl acetate emulsion and said first emulsion to obtain a second emulsion; and Applying the second emulsion with the aid of a screen process printing to form said first coating on said outer surface of the balloon, wherein said first coating is able to be printed an with a water-base ink.

15. A method for manufacturing a balloon made of a synthetic resin film comprising a first coating on an outer surface of said balloon, said method comprising the steps:

Adding water to a starch to obtain a mixture and subjecting the mixture to a heat treatment to obtain a first emulsion;

Adding a polyvinyl acetate emulsion to the first emulsion and mixing and stirring said polyvinyl acetate emulsion and said first emulsion to obtain a second emulsion; and Applying the second emulsion to form said first coating on the outer surface of the balloon with the aid of a screen process printing, wherein said first coating is able to be printed on with a water-base ink.

16. A method for manufacturing a balloon made of a synthetic resin film comprising a first coating on an outer surface of said balloon, said method comprising the steps:

Adding water to a potato starch to obtain a mixture and subjecting the mixture to a heat treatment to obtain a first emulsion;

Adding a polyvinyl acetate emulsion to the first emulsion and mixing and stirring said polyvinyl acetate emulsion and said first emulsion to obtain a second emulsion; and Applying the second emulsion to form said first coating on the outer surface of the balloon with the aid of a screen process printing, wherein said first coating is able to be printed on with a water-base ink.

17. A method for manufacturing a balloon made of a synthetic resin film comprising a first coating on an outer surface of said balloon, said method comprising the steps:

Adding water to a potato starch with a ratio of between 7:93 and 13:87 to obtain a mixture and heating the mixture to a temperature of 67° C. and stirring the mixture to obtain a first emulsion;

Adding a polyvinyl acetate emulsion to the first emulsion and mixing and stirring said polyvinyl acetate emulsion and said first emulsion to obtain a second emulsion; and Applying the second emulsion to form said first coating on the outer surface of the balloon with the aid of a screen process printing, wherein said first coating is able to be printed on with a water-base ink.

18. A method for manufacturing a balloon made of a synthetic resin film comprising a first coating on an outer surface of said balloon, said method comprising the steps:

Adding water to a potato starch with a ratio of between 7:93 and 13:87 to obtain a mixture and heating the mixture at a temperature between 64 to 67° C. and stirring the mixture to obtain a first emulsion;

Adding a polyvinyl acetate emulsion comprising a water content of 55% to the first emulsion with a ratio of 70:30 and mixing and stirring said polyvinyl acetate emulsion and said first emulsion to obtain a second emulsion; and Applying the second emulsion to form said first coating on the outer surface of the balloon with the aid of a screen process printing, wherein said first coating being able to be printed on with a water-base ink.

19. A method for manufacturing a balloon made of a synthetic resin film comprising a first coating on an outer surface of said balloon, said method comprising the steps of:

Adding water to a potato starch with a ratio of between 7:93 and 13:87 to obtain a mixture and heating the mixture to a temperature of 67° C. and adding a white pigment thereto and stirring the mixture to obtain a first emulsion;

Adding a polyvinyl acetate emulsion comprising a water content of 55% to the first emulsion with a ratio of 60:40 and mixing and stirring them to obtain a second emulsion; and Applying said second emulsion with the aid of a screen process printing to form said first coating on the outer surface of the balloon, wherein said first coating being able to be printed on with a water-base ink.

20. A method for manufacturing a balloon made of a synthetic resin film comprising a first coating on an outer surface of said balloon, said method comprising the steps:

Adding water to a potato starch with a ratio of between 4:96 and 20:80 to obtain a mixture and heating the mixture to a temperature of 67° C. and adding a white pigment and stirring the mixture to obtain a first emulsion;

Adding a polyvinyl acetate emulsion to the first emulsion with a ratio of between 6:4 to 8:2 to obtain a second emulsion;

Applying the second emulsion with the aid of a screen process printing to form said first coating on the outer surface of the balloon; and Printing an image or design on said first coating with a water base ink, wherein said first coating being able to be printed on.

21. A balloon made of a synthetic resin film according to any one of claims 1 to 8, wherein said balloon is fixed on an assistant guide paper for use in a printer, said assistant guide paper has a smaller size than said balloon.

22. A method for manufacturing a balloon made of a synthetic resin film according to any one of claims 9 to 20, further comprising fixing an assistant guide paper for use in a printer on said balloon; wherein said assistant guide paper has a smaller size than that of said balloon.

23. A balloon made of a synthetic resin film comprising a coating formed on an outer surface of the balloon; said first coating comprising a lower layer coating and an upper layer coating; said lower layer coating comprising an oilness binder and a white pigment; said upper layer coating comprising a polyvinyl acetate emulsion, water and a starch; said lower layer coating and said upper layer coating being superimposed on the outer surface of the balloon, wherein said first coating is able to be printed on with a water-base ink.

24. A balloon made of a synthetic resin film according to claim 23, wherein said starch is a potato starch.

25. A balloon made of a synthetic resin film comprising a first coating formed on an outer surface of the balloon; said first coating comprising a lower layer coating and an upper layer coating; said lower layer coating comprises an oilness binder and a white pigment with a ratio of between 85:15 and 70:30; said upper layer coating comprising a polyvinyl acetate emulsion, water and a potato starch; said polyvinyl acetate emulsion comprises a water content of 45% to 55%; said polyvinyl acetate emulsion and a mixture of the water and the potato starch are mixed together with a ratio of between 6:4 and 8:2; and wherein said lower layer coating and said upper layer coating are applied on the outer surface of the balloon with the aid of screen process printing, wherein said first coating is able to be printed on with a water-base ink.

26. A balloon made of a synthetic resin film comprising a first coating, formed on an outer surface of the balloon; said first coating comprising a lower layer coating and an upper layer coating; said lower layer coating comprising an oilness binder and a white pigment with a ratio of between 85:15 and 70:30; said upper layer coating comprising a polyvinyl acetate emulsion, water and a potato starch; said polyvinyl acetate emulsion comprises a water content of 45% to 55%; wherein said water and said potato starch are mixed together with a ratio of between 7:93 and 13:87; said polyvinyl acetate emulsion and a mixture of the water and the potato starch are mixed together with a ratio of between 6:4 and 8:2; and wherein said lower layer coating and said upper layer coating are applied on the outer surface of the balloon with the aid of screen process printing, wherein said first coating is able to be printed on with a water-base ink.

27. A balloon made of a synthetic resin film according to claim 26, wherein said upper layer coating is formed when a mixture comprising said polyvinyl acetate emulsion, water and said potato starch are applied several times.

28. A method for manufacturing a balloon made of a synthetic resin film comprising a first coating on an outer surface of said balloon, said method comprising the steps:
Applying a lower layer comprising a first material, wherein said first material comprises an oilness binder and a white pigment on said outer surface of the balloon;
Drying the first material,
Heating a second material, wherein said second material comprising a polyvinyl acetate emulsion, water and a starch to obtain a second emulsion; and
Applying said second emulsion for forming an upper layer coating on a lower layer coating, wherein said lower layer coating and said upper layer coating are formed; and
Wherein said first coating is able to be printed on with a water-base ink.

29. A method for manufacturing a balloon made of a synthetic resin film according to claim 28, wherein said starch is a potato starch.

30. A method for manufacturing a balloon made of a synthetic resin film according to claim 28, wherein said first material comprises the oilness binder and the white pigment in a ratio of between 85:15 and 70:30.

31. A method for manufacturing a balloon made of a synthetic resin film according to claim 28, wherein said second material is obtained when the water and a potato starch are mixed together and subjected to a heat treatment to obtain a mixture, wherein the mixture is heated followed by the addition of a polyvinyl acetate emulsion to the mixture in a ratio of between 4:6 and 2:8, wherein said polyvinyl acetate emulsion comprises a water content of 45%–55%.

32. A method for manufacturing a balloon made of a synthetic resin film according to claim 28, wherein said first material is obtained when water and a potato starch are mixed together in a ratio of between 4:96 and 20:80 and heated and stirred until the temperature is 67° C.; and wherein the second material is obtained when a polyvinyl acetate emulsion comprising a water content of 45%–55% is added to the first material with a ratio of between 4:6 and 2:8.

33. A method for manufacturing a balloon made of a synthetic resin film according to claim 28, wherein said first material is obtained when water and a potato starch are mixed together in a ratio of between 7:93 and 13:87 and heated and stirred until the temperature is 67° C.; and wherein the second material is obtained when a polyvinyl acetate emulsion comprising a water content of 45%–55% is added to the first material with a ratio of between 4:6 and 2:8.

34. A balloon made of a synthetic resin film comprising a first coating on the outer surface of the balloon, said balloon comprising an assistant guide paper for printing fixed on the balloon; wherein said assistant guide paper comprising an adhesive layer having a size larger than the outer diameter of said balloon, and wherein said balloon is able to be attached to the adhesive layer, and wherein said first coating is able to be printed on with a water-base ink.

35. A balloon made of a synthetic resin film comprising a first coating on an outer surface of the balloon comprising an assistant guide paper for printing fixed on the balloon; wherein said assistant guide paper comprising adhesive layers on both sides thereof so that the balloon is fixed to the assistant guide paper in a folded condition, and wherein said first coating is able to printed on with a water-base ink.

36. A method for manufacturing a balloon made of a synthetic resin film according to any one of claims 28 to 33, further comprising fixing said balloon to an assistant guide paper for printing, wherein the assistant guide paper comprises an adhesive layer having a larger size than the outer diameter of said balloon.

37. A method for manufacturing a balloon made of a synthetic resin film according to any one of claims 28 to 33, further comprising fixing said balloon to an assistant guide paper for printing, which comprises an adhesive layer on both sides thereof so that said balloon is attached to the assistant guide paper in a folded manner.

* * * * *

UNITED STATES PATENT AND TRADEMARK OFFICE
CERTIFICATE OF CORRECTION

PATENT NO.    : 6,613,417 B1                                              Page 1 of 1
DATED         : September 2, 2003
INVENTOR(S)   : Banzai It is certified that error appears in the above-identified patent and that said Letters Patent is hereby corrected as shown below:

<u>Title page, Item [54] and Column 1, lines 1 and 3,</u>
Change "BALLON" to -- BALLOON -- (both occurrences).

Signed and Sealed this

Fourteenth Day of October, 2003

JAMES E. ROGAN
*Director of the United States Patent and Trademark Office*